(12) United States Patent
Soman et al.

(10) Patent No.: US 11,564,053 B1
(45) Date of Patent: Jan. 24, 2023

(54) SYSTEMS AND METHODS TO CONTROL SPATIAL AUDIO RENDERING

(71) Applicant: QUALCOMM Incorporated, San Diego, CA (US)

(72) Inventors: Mehul Soman, San Jose, CA (US); Diyan Teng, Santa Clara, CA (US); Junsheng Han, Los Altos Hills, CA (US)

(73) Assignee: Qualcomm Incorportaed, San Diego, CA (US)

( * ) Notice: Subject to any disclaimer, the term of this patent is extended or adjusted under 35 U.S.C. 154(b) by 0 days.

(21) Appl. No.: 17/447,717

(22) Filed: Sep. 15, 2021

(51) Int. Cl.
*H04R 5/02* (2006.01)
*H04S 7/00* (2006.01)

(52) U.S. Cl.
CPC .............. *H04S 7/304* (2013.01); *H04S 7/308* (2013.01); *H04S 2420/01* (2013.01)

(58) Field of Classification Search
CPC ....... H04S 7/308; H04S 7/304; H04S 2420/01
See application file for complete search history.

(56) References Cited

U.S. PATENT DOCUMENTS

| | | |
|---|---|---|
| 2017/0357868 A1 | 12/2017 | Derakhshani et al. |
| 2018/0357038 A1 | 12/2018 | Olivieri et al. |
| 2021/0186350 A1 | 6/2021 | Lesso |
| 2022/0240016 A1* | 7/2022 | Blakemore .......... H04R 5/0335 |

FOREIGN PATENT DOCUMENTS

CN 111522002 A 8/2020

OTHER PUBLICATIONS

International Search Report and Written Opinion—PCT/US2022/074070—ISA/EPO—dated Nov. 16, 2022.

* cited by examiner

*Primary Examiner* — Ammar T Hamid
(74) *Attorney, Agent, or Firm* — Moore IP

(57) ABSTRACT

A method of controlling spatial audio rendering includes comparing a first heartbeat pattern to a second heartbeat pattern to generate a comparison result. The first heartbeat pattern is based on sensor information associated with a first sensor of a first sensor type, and the second heartbeat pattern is based on sensor information associated with a second sensor of a second sensor type. The method also includes, based on the comparison result, controlling a spatial audio rendering function associated with media playback.

30 Claims, 12 Drawing Sheets

SYSTEMS AND METHODS TO CONTROL SPATIAL AUDIO RENDERING

I. FIELD

The present disclosure is generally related to spatial audio rendering.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

During media playback, an electronic device (e.g., a mobile phone, a tablet, etc.) can employ spatial audio rendering to improve a user's listening experience. To illustrate, the electronic device can use an inertial measurement unit (IMU) to track an orientation of the user's head. Based on the head orientation, a multi-dimensional sound field can be mapped to the electronic device such that the user experiences a theatre-like sound from multiple directions (e.g., a surround sound experience). Thus, spatial audio rendering can improve the user's listening experience and enhance user enjoyment.

At least one challenge associated with spatial audio rendering is power consumption. For example, an electronic device that employs spatial audio rendering can consume a relatively large amount of power during a relatively short time span. In some scenarios, to conserve power, spatial audio rendering can be selectively disabled. As a non-limiting example, if a sensor detects that the user is moving while a display screen associated with the media is stationary, the electronic device can disable spatial audio rendering under the predicate that the user has walked away from the display screen. However, this may result in a false detection (e.g., if the user is walking on a treadmill). As another non-limiting example, if a camera detects that a user is in front of the display screen, the electronic device can enable spatial audio rendering. However, this may result in privacy concerns or may result in enabling spatial audio rendering when an unauthorized user is in front of the display screen.

III. SUMMARY

According to one implementation of the present disclosure, a device includes a memory configured to store instructions and one or more processors configured to execute the instructions. The one or more processors are configured to execute the instructions to compare a first heartbeat pattern to a second heartbeat pattern to generate a comparison result. The first heartbeat pattern is based on sensor information associated with a first sensor of a first sensor type, and the second heartbeat pattern is based on sensor information associated with a second sensor of a second sensor type. The one or more processors are also configured to execute the instructions to, based on the comparison result, control a spatial audio rendering function associated with media playback.

According to another implementation of the present disclosure, a method of controlling spatial audio rendering includes comparing a first heartbeat pattern to a second heartbeat pattern to generate a comparison result. The first heartbeat pattern is based on sensor information associated with a first sensor of a first sensor type, and the second heartbeat pattern is based on sensor information associated with a second sensor of a second sensor type. The method also includes, based on the comparison result, controlling a spatial audio rendering function associated with media playback.

According to another implementation of the present disclosure, a non-transitory computer-readable medium includes instructions that, when executed by one or more processors, cause the one or more processors to compare a first heartbeat pattern to a second heartbeat pattern to generate a comparison result. The first heartbeat pattern is based on sensor information associated with a first sensor of a first sensor type, and the second heartbeat pattern is based on sensor information associated with a second sensor of a second sensor type. The instructions, when executed by the one or more processors, further cause the one or more processors to, based on the comparison result, control a spatial audio rendering function associated with media playback.

According to another implementation of the present disclosure, an apparatus includes means for comparing a first heartbeat pattern to a second heartbeat pattern to generate a comparison result. The first heartbeat pattern is based on sensor information associated with a first sensor of a first sensor type, and the second heartbeat pattern is based on sensor information associated with a second sensor of a second sensor type. The apparatus also includes means for controlling a spatial audio rendering function associated with media playback based on the comparison result.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
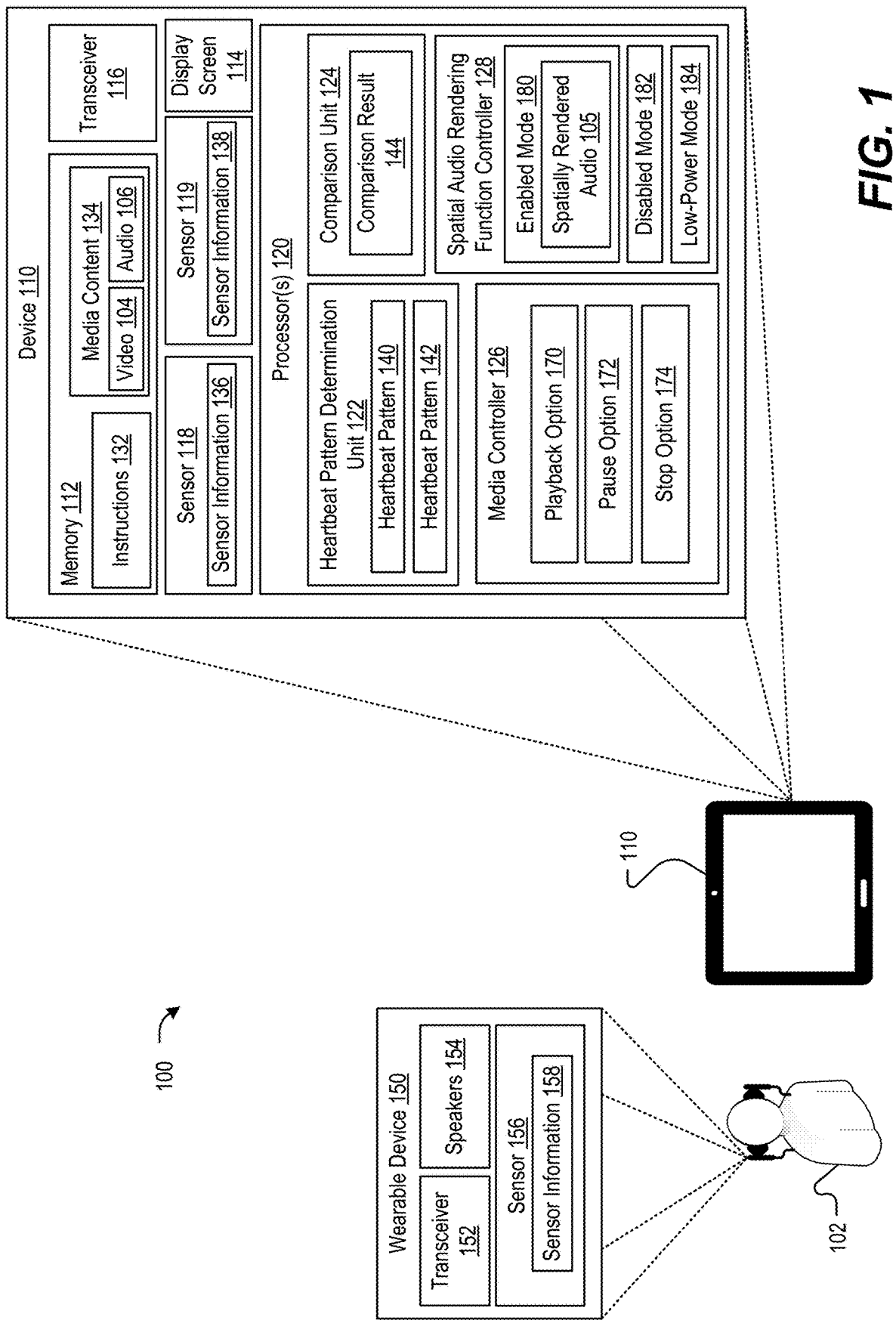
FIG. 1 is a block diagram of a particular illustrative aspect of a system configured to control spatial audio rendering based on detected heartbeat patterns, in accordance with some examples of the present disclosure.

Systems and methods of controlling a spatial audio rendering function are disclosed. An electronic device, such as a tablet or a phone, can include a display screen that displays media content presented to a user. In some scenarios, the user can wear a wearable device, such as earpieces, to listen to audio associated with the media content as video associated with the media content is presented on the display screen of the electronic device. The electronic device can utilize spatial audio rendering to process the audio associated with the media content to generate spatially rendered audio that creates a surround sound experience for the user when experienced through the wearable device. For example, the electronic device can track an orientation of the user's head and, based on the orientation, generate a multi-dimensional sound field that is mapped to the electronic device such that the user experiences surround sound through the wearable device when the user is looking at the display screen.

To conserve battery power associated with the spatial audio rendering, the electronic device can disable the spatial audio rendering upon a determination that the user is no longer present or no longer watching the display screen. The techniques herein utilize detected heartbeat patterns of the user to determine whether the user is present and watching the display screen. To illustrate, the wearable device can include a first sensor, such as a photoplethysmogram (PPG) sensor, that uses a light source and a photodetector at a surface of the user's skin to measure volumetric variations of blood circulation (e.g., first sensor information). The first sensor information is indicative of a first heartbeat pattern of the user, as detected by the wearable device, and is transmitted to the electronic device. The electronic device can include a second sensor, such as a millimeter wave (mmWave) radar sensor, that transmits electromagnetic waves towards the user if the user is in front of the display screen. The electromagnetic waves are reflected off the user and measured by the second sensor as second sensor information that is indicative of a second heartbeat pattern of the user.

If the first heartbeat pattern (based on the PPG sensor reading) is aligned with the second heartbeat pattern (based on the mmWave radar sensor reading), the electronic device can determine that the user is viewing the media content. For example, when the first heartbeat pattern is aligned with the second heartbeat pattern, the electronic device can determine that the user of the wearable device (e.g., the earpieces with the PPG sensor) is the same person in front of the display screen, and thus is looking at the display screen. In this scenario, the electronic device can continue spatial audio rendering to enhance the user experience. However, if the first heartbeat pattern is not aligned with the second heartbeat pattern, the electronic device can determine that the user is no longer viewing the media content at the electronic device. If it is determined that the user is no longer viewing the media content, the electronic device can disable spatial audio rendering to conserve battery power.

It should be understood that the PPG sensor and the mmWave radar sensor are merely used for illustrative purposes. The techniques described herein can be implemented using any sensors (integrated into a wearable device and an electronic device with a display screen) that can generate sensor information indicative of a heartbeat pattern. In some scenarios, the sensors in the wearable device and the electronic device can be similar types of sensors. In other scenarios, the sensors in the wearable device and the electronic device can be different types of sensors, as described above.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 110 including one or more processors ("processor(s)" 120 of FIG. 1), which indicates that in some implementations the device 110 includes a single processor 120 and in other implementations the device 110 includes multiple processors 120. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to control spatial audio rendering based on detected heartbeat patterns is disclosed and generally designated 100. The system 100 includes a device 110 and a wearable device 150. The device 110 can correspond to a display device that is operable to display video 104 associated with media content 134. As non-limiting examples, the device 110 can correspond to a mobile phone, a laptop, a tablet, a television, etc. The wearable device 150 can correspond to an audio output device that can be worn by a user 102. The wearable device 150 can be operable to output audio 106 associated with the media content 134. As non-limiting examples, the wearable device 150 can correspond to earpieces, a headset, headphones, etc.

The device 110 can be paired with, or coupled to, the wearable device 150 such that the wearable device 150 can output the audio 106 associated with the media content 134 played at the device 110. In some scenarios, the device 110 can be paired with the wearable device 150 using a wireless connection (e.g., a Bluetooth® (a registered trademark of Bluetooth SIG, Inc., Washington) connection). For example, the device 110 can communicate with the wearable device 150 using a low-energy protocol (e.g., a Bluetooth® low energy (BLE) protocol).

The device 110 can control spatial audio rendering of the audio output by the wearable device 150. For example, the wearable device 150 includes a transceiver 152 and one or more speakers 154. In some implementations, the wearable device 150 can include additional components. As a non-limiting example, as described with respect to FIG. 6, the wearable device 150 can include a camera 690 (e.g., an always-on-camera). The transceiver 152 can be configured to receive the audio 106 associated with the media content 134 from the device 110 and output the audio 106 at the speakers 154 as sound. As described below, the device 110 can selectively perform spatial audio rendering on the audio 106 to generate spatially rendered audio 105. In this scenario, the spatially rendered audio 105 is transmitted to the wearable device 150 and output by the speakers 154 for increased user enjoyment.

The device includes a memory 112, a display screen 114, a transceiver 116, a sensor 118, a sensor 119, and one or more processors 120. The transceiver 116 can be configured to receive a media stream that includes the media content 134. Additionally, or in the alternative, the transceiver 116 can transmit signals to, and receive signals from, the wearable device 150. As a non-limiting example, when the media content 134 is played at the device 110 such that the video 104 associated with the media content 134 is displayed at the display screen 114, the transceiver 116 can transmit the audio 106 associated with the media content 134 to the wearable device 150 for audio playback. In some scenarios, as described below, the transceiver 116 can transmit the spatially rendered audio 105 to the wearable device 150 for audio playback.

The processor 120 includes a heartbeat pattern determination unit 122, a comparison unit 124, a media controller 126, and a spatial audio rendering function controller 128. According to one implementation, one or more of the components of the processor 120 can be implemented using dedicated circuitry. As non-limiting examples, one or more of the components of the processor 120 can be implemented using a field programmable gate array (FPGA), an application-specific integrated circuit (ASIC), etc. According to another implementation, one or more of the components of the processor 120 can be implemented by executing instructions 132 stored in the memory 112. For example, the memory 112 can be a non-transitory computer-readable medium that stores instructions 132 executable by the processor 120 to perform the operations described herein.

The media controller 126 includes a playback option 170, a pause option 172, and a stop option 174. If the playback option 170 is selected, the media controller 126 can play the media content 134 such that video 104 associated with the media content 134 is displayed at the display screen 114 and the audio 106 associated with the media content 134 (or the spatially rendered audio 105) is output as sound at the speakers 154 of the wearable device 150. For example, the transceiver 116 can transmit the audio 106 associated with the media content 134 (or the spatially rendered audio 105) to the transceiver 152 of the wearable device 150, and the speakers 154 of the wearable device 150 can output the audio 106 (or the spatially rendered audio 105) as sound. Thus, as described below, when the playback option 170 is selected, the audio 106 can selectively undergo spatial audio rendering such that the spatially rendered audio 105 is generated and transmitted to the wearable device 150 for playback.

If the pause option 172 is selected, the media controller 126 can pause playback of the media content 134 and transmission of the audio 106 associated with the media content 134 (or the spatially rendered audio 105) to the wearable device 150 is also paused. If the stop option 174 is selected, the media controller 126 can stop playback of the media content and transmission of the audio 106 (or the spatially rendered audio 105) to the wearable device 150 is halted. Although the playback option 170, the pause option 172, and the stop option 174 are illustrated, the media controller 126 can include other options for the media content 134, such as a record option (not shown), a volume option (not shown), a digital tag insert option 570 as described with respect to FIG. 5, etc.

Prior to enabling a spatial audio rendering function to improve a listening experience for the user 102 while watching playback of the media content 134 on the display screen 114, the processor 120 can determine whether the user 102 is watching the media content 134. If the processor 120 determines that the user 102 (e.g., the wearer of the wearable device 150) is watching the media content 134, the processor 120 can enable the spatial audio rendering function to improve the listening experience. However, if the processor 120 determines that the user 102 is not watching the media content 134, the processor 120 can disable the spatial audio rendering function to conserve power. To determine whether the user 102 is watching the media content 134, the processor 120 can determine whether the user 102 is present (e.g., within a vicinity of the device 110). As used herein, the user 102 can be "within the vicinity" of the device 110 if the user 102 is close enough to the device 110 to consume the media content 134 presented on the display screen 114. In response to determining that the user 102 is within the vicinity of the device 110, as described below, the processor 120 can use detected cardiovascular properties (e.g., heartbeat patterns 140, 142) to determine whether the user 102 is watching the media content 134.

To illustrate, the sensor 119 can generate sensor information 138 that indicates whether a person is within the vicinity of the device 110 (e.g., whether the presence of a person is detected in front of the display screen 114). According to one implementation, the sensor 119 can include a camera (e.g., a low-power camera) that captures images of a surrounding environment of the device 110 (e.g., captures images of an environment in front of the display screen 114). In this scenario, the captured images can correspond to the sensor information 138 and the processor 120 can perform object detection, object recognition, or both, on the captured images to determine whether a person is within the vicinity of the device 110. According to another implementation, the sensor 119 can include a microphone that captures audio of the surrounding environment. In this scenario, the captured audio can correspond to the sensor information 138 and the processor 120 can process the audio to determine whether a person is within the vicinity of the device 110.

In response to determining that a person is within the vicinity of the device 110, the processor 120 can determine whether the person (e.g., the user 102) that is wearing the wearable device 150 is the same person watching the display screen 114. To accomplish this task, the processor 120 can determine whether the person wearing the wearable device 150 has a similar heartbeat pattern as the person standing in front of the display screen 114. To illustrate, the heartbeat pattern determination unit 122 can be configured to determine a heartbeat pattern 140 as determined based on a sensor 156 of the wearable device 150 and a heartbeat pattern 142 as determined based on the sensor 118 of the device 110.

For example, the sensor 156 of the wearable device 150 can detect sensor information 158, and the transceiver 152 of the wearable device 150 can transmit the sensor information 158 to the device 110 for processing by the heartbeat pattern determination unit 122. According to one implementation, the sensor 156 corresponds to a photoplethysmogram (PPG) sensor. In this implementation, the sensor information 158 can include measured light reflections of blood volume variations associated with the user 102. Thus, while the wearable device 150 is proximate to an ear of the user 102, the sensor 156 can measure the light reflections of the blood volume variations to generate the sensor information 158. The heartbeat pattern determination unit 122 can be configured to determine the heartbeat pattern 140 of the wearer of the wearable device 150 (e.g., the user 102) based on the sensor information 158.

Additionally, the sensor 118 of the device 110 can detect sensor information 136 and provide the sensor information 136 to the heartbeat pattern determination unit 122 for processing. According to one implementation, the sensor 118 corresponds to a millimeter wave (mmWave) radar sensor. In this implementation, the sensor information 136 can be determined based on reflected electromagnetic waves that are transmitted from the sensor 118. For example, the sensor 118 can transmit electromagnetic waves to a target (e.g., the user 102) in front of the display screen 114. The electromagnetic waves can be reflected from the target and measured by the sensor 118 to generate the sensor information 136. The heartbeat pattern determination unit 122 can be configured to determine the heartbeat pattern 142 of the target based on the sensor information 136 (e.g., based on deviations between originally transmitted electromagnetic waves and the reflected electromagnetic waves).

According to the implementation described above, the sensor 156 can have a first sensor type (e.g., a PPG sensor type) and the sensor 118 can have a second sensor type (e.g., a mmWave radar sensor type) that is distinct from the first sensor type. However, in other implementations, the sensors 156, 118 can have similar sensor types. As a non-limiting example, in other implementations, the sensor 156 can include a mmWave radar sensor. It should be understood that the techniques described herein can be implemented using other sensors that detect information that is usable to determine a heartbeat pattern. The sensor types described herein are not intended to be limiting.

The comparison unit 124 can be configured to compare the heartbeat pattern 140 to heartbeat pattern 142 to generate a comparison result 144. The comparison result 144 can indicate whether the heartbeat pattern 140 is within an alignment threshold of the heartbeat pattern 142. For example, if the person wearing the wearable device 150 is the same person standing in front of the display screen 114, the heartbeat pattern 140 (as detected using the sensor 156 of the wearable device 150) should be within the alignment threshold of the heartbeat pattern 142 (as detected using the sensor 118 of the device 110). As used herein, the heartbeat patterns 140, 142 can be "within the alignment threshold" if there is a deviation of less than a particular percent (e.g., five percent, ten percent, fifteen percent, etc.) between the heartbeat patterns 140, 142. The deviation can be based on a frequency of the heartbeat, a magnitude of the heartbeat, other heartbeat characteristics, or a combination thereof. In some scenarios, a determination of whether the heartbeat patterns 140, 142 are "within the alignment threshold" can be based on a cross-correlation statistic between heartbeat patterns 140, 142.

According to one implementation, in response to the comparison result 144 indicating that the heartbeat pattern 140 is within the alignment threshold of the heartbeat pattern 142, the spatial audio rendering function controller 128 can enable use of the spatial audio rendering function. For example, the spatial audio rendering function controller 128 can enter an enabled mode 180 to perform spatial audio rendering on the audio 106 to generate the spatially rendered audio 105. To perform spatial audio rendering, the spatial audio rendering function controller 128 can track an orientation of the user's 102 head and, based on the orientation, generate a multi-dimensional sound field around the user's 102 head and modify the audio 106 such that when the modified version of the audio 106 (e.g., the spatially rendered audio 105) is output at the speakers 154, the output sound is projected throughout the multi-dimensional sound field. By transmitting the spatially rendered audio 105, the user 102 can experience enhanced sound output (e.g., a surround sound output based on a position of the user's 102 head) through the wearable device 150 while the user is looking at the display screen 114. Thus, if the processor 120 determines that the user 102 wearing the wearable device 150 is looking at the display screen 114 (e.g., through the aligned heartbeat patterns 140, 142), the processor 120 can enhance the user's 102 experience by performing spatial audio rendering on the audio 106.

According to one implementation, in response to the comparison result 144 indicating that the heartbeat pattern 140 is not within the alignment threshold of the heartbeat pattern 142, the spatial audio rendering function controller 128 can disable use of the spatial audio rendering function. For example, the spatial audio rendering function controller 128 can enter a disabled mode 182 to disable performance of spatial audio rendering on the audio 106. As a result, the audio 106 can be transmitted to the wearable device 150 without undergoing spatial audio rendering to decrease the power consumption that is associated with performing spatial audio rendering. Thus, if the processor 120 determines the user 102 wearing the wearable device 150 is not looking at the display screen 114 (e.g., through the misaligned heartbeat patterns 140, 142), the processor 120 can disable spatial audio rendering to conserve power.

According to one implementation, in response to the comparison result 144 indicating that the heartbeat pattern 140 is not within the alignment threshold of the heartbeat pattern 142, the spatial audio rendering function controller 128 can transition the spatial audio rendering function to operate in a low-power mode 184. To illustrate, the spatial audio rendering function controller 128 can enter the low-power mode 184 to reduce the amount of resources used perform spatial audio rendering on the audio 106. As non-limiting examples, the spatial audio rendering function controller 128 can use a low-power sensor to track an orientation of the user's 102 head as opposed to a high-power sensor. As another non-limiting example, to reduce power consumption in the low-power mode 184, the spatial audio rendering function controller 128 can bypass head tracking and use a default multi-dimensional sound field to modify the audio 106. Thus, if the processor 120 determines the user 102 wearing the wearable device 150 is not looking at the display screen 114 (e.g., through the misaligned heartbeat patterns 140, 142), low-power spatial audio rendering can be enabled to conserve power.

In some scenarios, the spatial audio rendering function controller 128 can enter the disabled mode 182 or the low-power mode 184 when the heartbeat pattern 142 is undeterminable. For example, in some scenarios, if the user 102 is not in front of the display screen 114 or the processor 120 determines that there is nobody in the vicinity of the display screen 114 based on the sensor information 138, the sensor 118 may not be able to generate sensor information 136 that can be used to determine the heartbeat pattern 142. In these scenarios, the spatial audio rendering function controller 128 can enter the disabled mode 182 or the low-power mode 184 to conserve power.

The system 100 of FIG. 1 enables the use of cardiovascular activity (e.g., the determined heartbeat patterns 140, 142) to determine whether the user 102 is in front of the display screen 114. Based on the determination, the system 100 selectively enables and disables spatial audio rendering. For example, spatial audio rendering can be enabled in response to a determination that the user 102 is in front of the display screen 114 to increase user enjoyment while listening to the media content 134, and spatial audio rendering can be disabled in response to a determination that the user 102 is not in front of the display screen 114 to conserve power. Using cardiovascular activity to determine whether the user 102 is in front of the display screen 114 increases user privacy compared to vision-based approaches. For example, using a vision-based approach (e.g., cameras) to determine whether the user 102 is in front of the display screen 114 may require the use of high-resolution cameras, which could be a privacy concern. By determining whether the user 102 is in front of the display screen 114 based on a comparison of the heartbeat patterns 140, 142, privacy concerns associated with cameras can be alleviated.

Additionally, using cardiovascular activity to determine whether the user 102 is in front of the display screen 114 decreases the likelihood of false positives. To illustrate, the use of low-resolution cameras or ultrasounds to determine whether the user 102 is in front of the display screen 114 could result in false positives. For example, if a low-resolution image captures a person in front of the display screen 114 other than user 102, the person could mistakenly be identified as the user and spatial audio rendering may be enabled when the user 102 is not in front of the display screen 114, causing an increase in power consumption. By comparing the heartbeat patterns 140, 142, the likelihood of a mistaken identity can be significantly decreased.

Additionally, while activity recognition can be used to determine whether the user 102 is in front of the display screen 114, activity recognition can also be prone to false negatives. For example, if the user 102 begins to walk on a treadmill in front of the display screen 114 while the device 110 is stationary, an activity recognition approach may result in a determination that the user is no longer in front of the display screen 114 because of a detected increase in user activity (e.g., walking). However, using cardiovascular activity, as described above, reduces the likelihood of false negatives because the determination is based on a comparison of the heartbeat patterns 140, 142.

Figure 2:
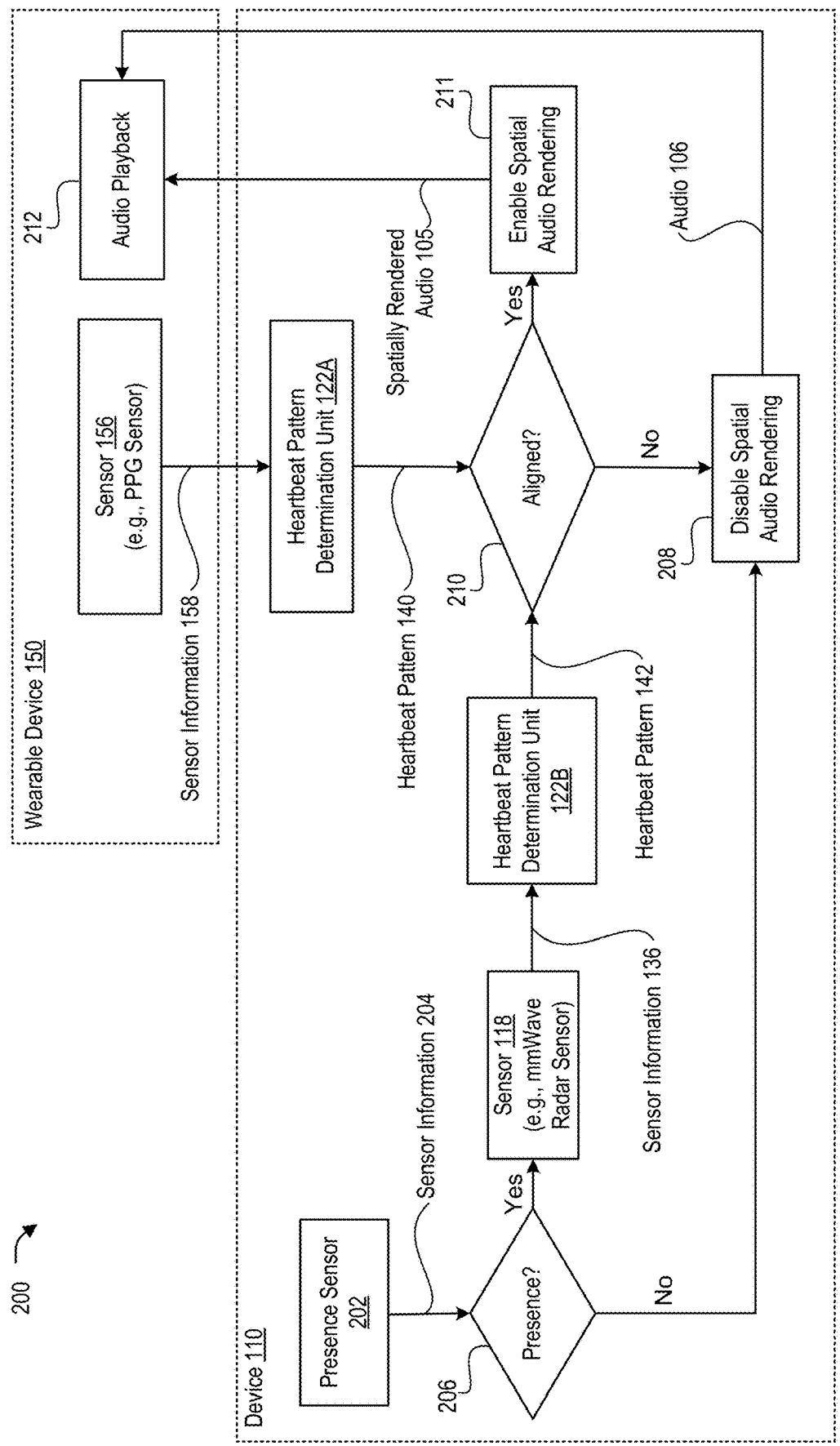
FIG. 2 is a flow diagram of a particular illustrative aspect of a system configured to control spatial audio rendering based on detected heartbeat patterns, in accordance with some examples of the present disclosure.

Referring to FIG. 2, a particular illustrative aspect of a system configured to control spatial audio rendering based on detected heartbeat patterns is disclosed and generally designated 200. In particular, the system 200 illustrates operations that may be initiate, performed, or controlled by one or more devices of the system 100 of FIG. 1, such as the device 110 and the wearable device 150.

According to the example of FIG. 2, the device 110 includes a presence sensor 202. According to one implementation, the presence sensor 202 can correspond to the sensor 119 of FIG. 1 and the sensor information 204 can correspond to the sensor information 138 of FIG. 1. The presence sensor 202 can be configured to generate sensor information 204 that indicates whether the presence of a person is detected in front of the display screen 114. Optionally, the presence sensor 202 can include a camera (e.g., a low-power camera) that captures images of an environment in front of the display screen 114. Optionally, the presence sensor 202 can include a microphone that captures audio of the surrounding environment.

At decision block 206, the device 110 can determine whether the presence of a person is detected in front of the display screen 114 based on the sensor information 204. In response to a determination that there is no detected person in front of the display screen 114, the device 110 can disable spatial audio rendering, at block 208, and send the audio 106 associated with the media content 134 to the wearable device 150 for playback, at block 212.

The sensor 156 can generate the sensor information 158 and provide the sensor information 158 to a heartbeat pattern determination unit 122A. According to one implementation, the heartbeat pattern determination unit 122A can correspond to the heartbeat pattern determination unit 122 of FIG. 1. The sensor 156 can correspond to or include a PPG sensor. In this implementation, the sensor information 158 is based on measured light reflections of blood volume variations associated with the user 102. Thus, while the wearable device 150 is proximate to an ear of the user 102, the sensor 156 can measure the light reflections of the blood volume variations to generate the sensor information 158. The heartbeat pattern determination unit 122A can be configured to determine the heartbeat pattern 140 of the wearer of the wearable device 150 (e.g., the user 102) based on the sensor information 158.

Additionally, in response to the determination that there is a detected person in front of the display screen 114, at the decision block 206, the sensor 118 can generate the sensor information 136 and provide the sensor information 136 to a heartbeat pattern determination unit 122B. According to one implementation, the heartbeat pattern determination unit 122B can correspond to the heartbeat pattern determination unit 122 of FIG. 1. The sensor 156 can correspond to or include a mmWave radar sensor. In this implementation, the sensor information 136 can be determined based on reflected electromagnetic waves that are transmitted from the sensor 118. For example, the sensor 118 can transmit electromagnetic waves to the person in front of the display screen 114. The electromagnetic waves can be reflected from the target and measured by the sensor 118 to generate the sensor information 136. The heartbeat pattern determination unit 122B can be configured to determine the heartbeat pattern 142 of the person in front of the display screen 114 based on the sensor information 136 (e.g., based on deviations between originally transmitted electromagnetic waves and the reflected electromagnetic waves).

At decision block 210, the device 110 can determine whether the heartbeat pattern 140 is aligned with the heartbeat pattern 142. In response to a determination that the heartbeat patterns 140, 142 are not aligned, the device 110 can disable spatial audio rendering, at block 208, and send the audio 106 associated with the media content 134 to the wearable device 150 for playback, at block 212. In response to a determination that the heartbeat patterns 140, 142 are aligned, the device 110 can enable spatial audio rendering, at block 211, and send the spatially rendered audio 105 to the wearable device 150 for playback, at block 210.

The system 200 of FIG. 2 enables the use of cardiovascular activity (e.g., the determined heartbeat patterns 140, 142) to determine whether to enable spatial audio rendering. For example, spatial audio rendering can be enabled to increase user enjoyment in response to a determination that the heartbeat patterns 140, 142 are aligned, and spatial audio rendering can be disabled to conserve power in response to a determination that the heartbeat patterns 140, 142 are not aligned. As described above, using cardiovascular activity to determine whether the user 102 is in front of the display screen 114 increases user privacy compared to vision-based approaches, decreases the likelihood of false positives, and decreases the likelihood of false negatives.

Figure 3:
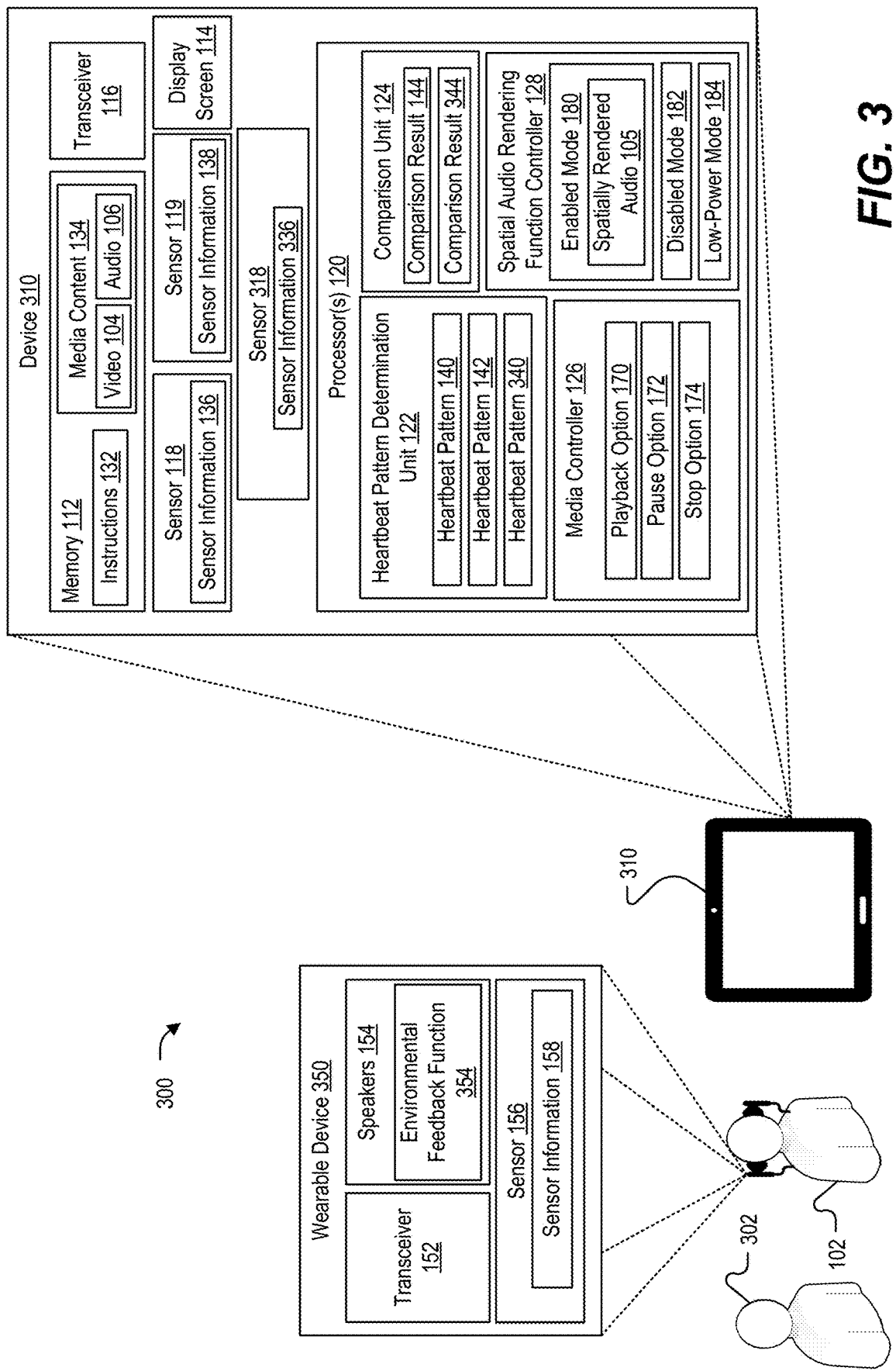
FIG. 3 is a block diagram of another particular illustrative aspect of a system configured to control spatial audio rendering based on detected heartbeat patterns, in accordance with some examples of the present disclosure.

Referring to FIG. 3, another particular illustrative aspect of a system configured to control spatial audio rendering based on detected heartbeat patterns is disclosed and generally designated 300. The system 300 includes a device 310 and a wearable device 350. According to one implementation, the device 310 corresponds to the device 110 of FIG. 1, and the wearable device 350 corresponds to the wearable device 150 of FIG. 1.

The device 310 includes similar components as the device 110 of FIG. 1 and can operate in a substantially similar manner. For example, the device 310 includes the memory 112, the transceiver 116, the sensor 118, the sensor 119, the display screen 114, and the processor 120. The device 310 also includes a sensor 318. Based on sensor information 336 from the sensor 318, the processor 120 can determine whether a second user 302 is within a vicinity of the device 310.

To illustrate, the sensor 318 can detect sensor information 336 and provide the sensor information 336 to the heartbeat pattern determination unit 122 for processing. According to one implementation, the sensor 318 corresponds to another mmWave radar sensor. Thus, the sensor information 336 can be determined based on reflected electromagnetic waves that are transmitted from the sensor 318. For example, the sensor 318 can transmit electromagnetic waves to a target (e.g., the user 302). The electromagnetic waves can be reflected from the target and measured by the sensor 318 to generate the sensor information 336. The heartbeat pattern determination unit 122 can be configured to determine a heartbeat pattern 340 of the target based on the sensor information 336 (e.g., based on deviations between originally transmitted electromagnetic waves and the reflected electromagnetic waves). According to some implementations, the processor 120 can differentiate between the user 102 and the user 302 based on a comparison result 344. For example, if a comparison result 344 indicates the heartbeat pattern 340 is not aligned with the heartbeat pattern 140 determined based on the sensor information 158 from the wearable device 350, the processor 120 can determine that there are two different users 102, 302. According to other implementations, the processor 120 can differentiate the users 102, 302 in response to a misalignment of the heartbeat patterns 142, 340.

In response to determining that the user 302 is within the vicinity of the device 310 and is different from the user 102, the processor 120 can be configured to determine whether the user 302 is speaking. For example, as described above, according to one implementation, the sensor 119 can correspond to a microphone. In this implementation, the processor 120 can use the sensor information 138 (e.g., the captured audio) from the sensor 119 to determine whether the user 302 is speaking. According to another implementation, the sensor 119 can correspond to a camera. In this implementation, the processor 120 can use the sensor information 138 (e.g., captured images) from the sensor 119 to determine whether the user 302 is speaking.

In response to a determination that the user 302 is speaking, the processor 120 can disable an environmental feedback function 354 at the wearable device 350. For example, the processor 120 can send a signal to the wearable device 350 to disable the environmental feedback function 354 to enable the user 102 to hear the user 302. One example of disabling the environmental feedback function 354 can include disabling a noise cancellation function to enable the user 102 to hear the user 302. Optionally, the processor 120 can also, or alternatively, pause media playback in response to a determination that the user 302 is speaking. For example, the media controller 126 can select the pause option 172 to pause playback of the media content 134 in response to a determination that the user 302 is speaking.

According to one implementation, a head tracking operation associated with the spatial audio rendering function can continue while the media playback is paused to enable spatial audio rendering function to quickly resume when playback continues (e.g., when the user 302 leaves the area).

Thus, the techniques described with respect to FIG. 3 enable the processor 120 to differentiate between different users 102, 302 based on detected heartbeat patterns. For example, another mmWave radar sensor (e.g., the sensor 318) can be integrated into the device 310 to facilitate the detection of another heartbeat pattern 340. Based on the detection of the other user 302, spatial audio processing can be temporarily paused while the users 302, 102 are engaged in conversation.

Figure 4:
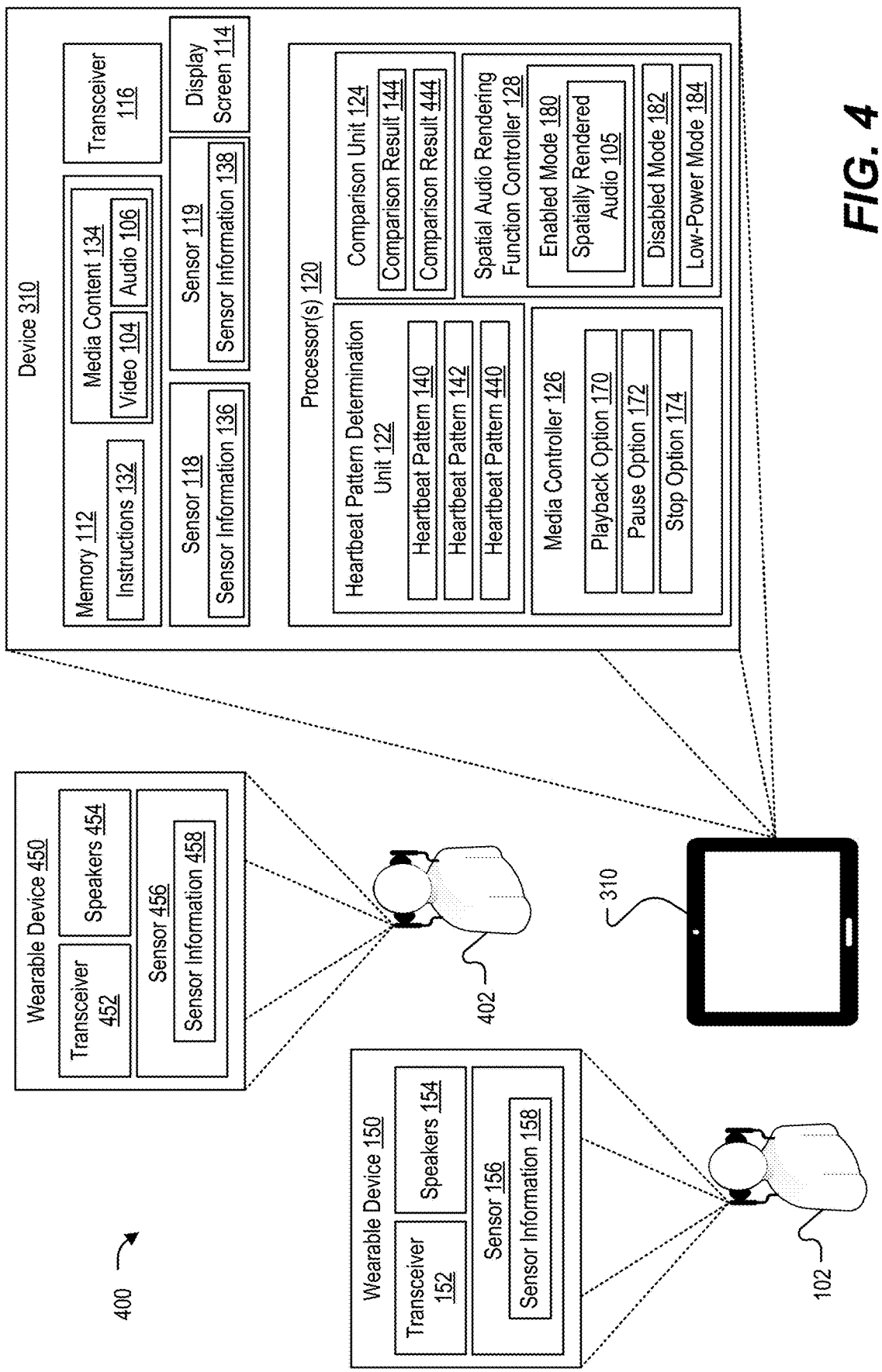
FIG. 4 is a block diagram of another particular illustrative aspect of a system configured to control spatial audio rendering based on detected heartbeat patterns, in accordance with some examples of the present disclosure.

Referring to FIG. 4, another particular illustrative aspect of a system configured to control spatial audio rendering based on detected heartbeat patterns is disclosed and generally designated 400. The system 400 includes the device 110, the wearable device 150, and a wearable device 450.

The wearable device 450 includes a transceiver 452, one or more speakers 454, and a sensor 456. Components of the wearable device 450 can operate in a substantially similar manner as components of the wearable device 150. For example, the sensor 456 of the wearable device 450 can detect sensor information 458, and the transceiver 452 of the wearable device 450 can transmit the sensor information 458 to the device 110 for processing by the heartbeat pattern determination unit 122. According to one implementation, the sensor 456 corresponds to a PPG sensor. In this implementation, the sensor information 458 is based on measured light reflections of blood volume variations associated with a user 402. Thus, while the wearable device 450 is proximate to an ear of the user 402, the sensor 456 can measure the light reflections of the blood volume variations to generate the sensor information 458.

The heartbeat pattern determination unit 122 can be configured to determine a heartbeat pattern 440 of the wearer of the wearable device 450 (e.g., the user 402) based on the sensor information 458. The comparison unit 124 can be configured to compare the heartbeat pattern 440 to heartbeat pattern 142 to generate a comparison result 444. The comparison result 444 can indicate whether the heartbeat pattern 440 is within an alignment threshold of the heartbeat pattern 142. For example, if the person wearing the wearable device 450 is the same person standing in front of the display screen 114, the heartbeat pattern 440 (as detected using the sensor 456 of the wearable device 450) should be within the alignment threshold of the heartbeat pattern 142 (as detected using the sensor 118 of the device 110).

Thus, the techniques described with respect to FIG. 4 enable the processor 120 to distinguish the wearable device 450 from the wearable device 150 based on the comparison results 144, 444. For example, both users 102, 402 can have similar wearable devices 150, 450. By comparing the heartbeat patterns 140, 440 derived from the sensor information 158, 458 detected by each wearable device 150, 450, respectively, to the heartbeat pattern 142 associated with the sensor information 136 from the sensor 118, the processor 120 can determine which heartbeat patterns align to distinguish the wearable devices 150, 450.

Figure 5:
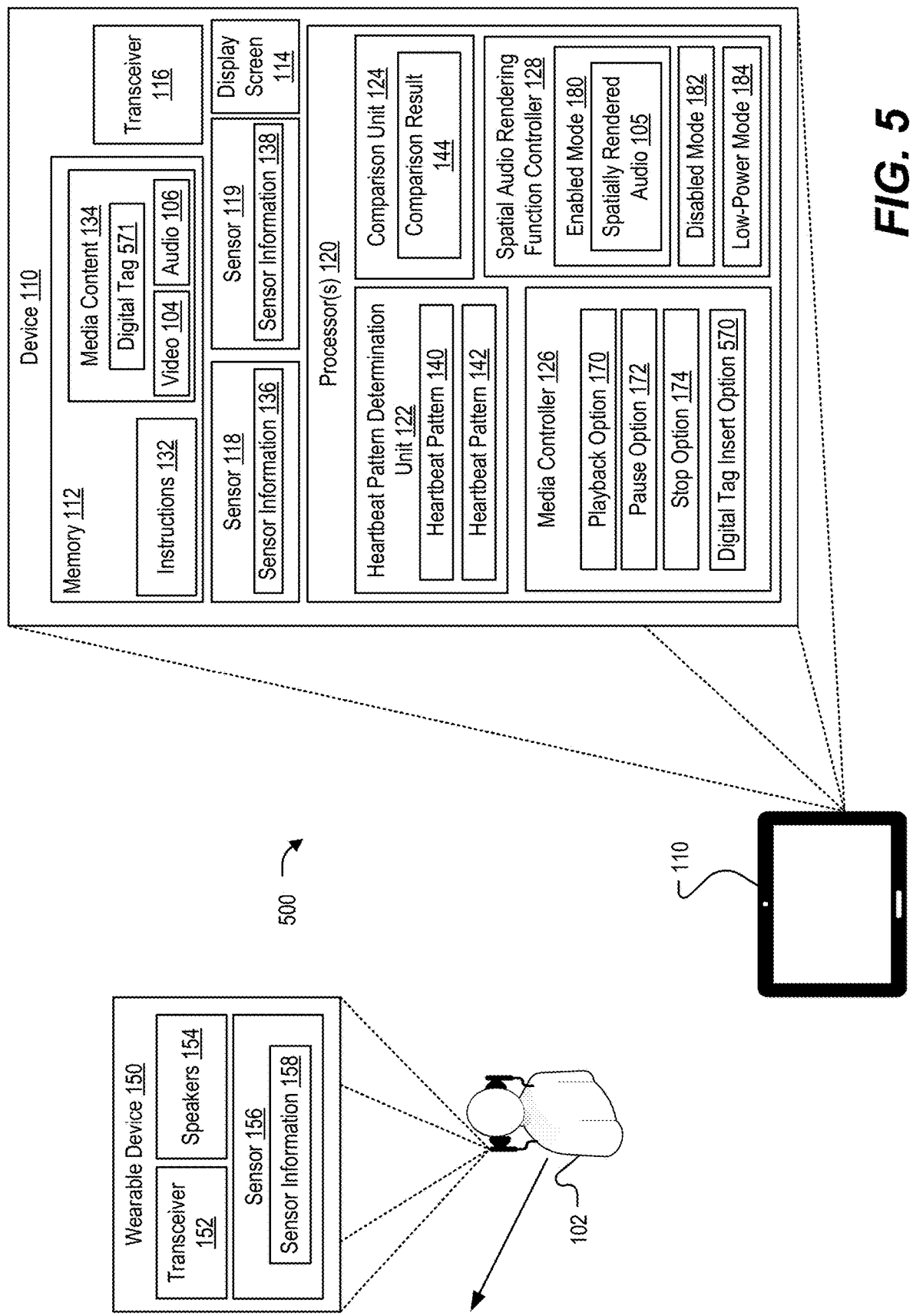
FIG. 5 is a block diagram of another particular illustrative aspect of a system configured to control spatial audio rendering based on detected heartbeat patterns, in accordance with some examples of the present disclosure.

Referring to FIG. 5, another particular illustrative aspect of a system configured to control spatial audio rendering based on detected heartbeat patterns is disclosed and generally designated 500. The system 500 includes the device 110 and the wearable device 150.

In the illustrative example of FIG. 5, the user 102 is leaving the vicinity of the device 110. As a result of the user 102 leaving the vicinity of the device 110, the electromagnetic waves transmitted from the sensor 118 (e.g., the mmWave radar sensor) are no longer reflected off the user 102 and the sensor information 136 generated by the sensor 118 is no longer reflective of the user's 102 heartbeat pattern. Thus, when the heartbeat pattern determination unit 122 generates the heartbeat pattern 142 based on the sensor information 136, the determined heartbeat pattern 142 is not indicative of the user's 102 heartbeat pattern. As a result, the comparison result 144 indicates that the heartbeat patterns 140, 142 are misaligned, and the processor 120 can determine that the user 102 is not within the vicinity of the device 110.

The spatial audio rendering function controller 128 can be configured to disable use of the spatial audio rendering function in response to the determination that the user 102 is not within the vicinity of the device 110. For example, the spatial audio rendering function controller 128 can enter the disabled mode 182 to disable performance of spatial audio rendering on the audio 106. As a result, the audio 106 can be transmitted to the wearable device 150 without undergoing spatial audio rendering to decrease the power consumption that is associated with performing spatial audio rendering. Thus, if the processor 120 determines the user 102 wearing the wearable device 150 has left the vicinity of the device 110 (e.g., through the misaligned heartbeat patterns 140, 142), the processor 120 can disable spatial audio rendering to conserve power.

Optionally, the processor 120 can insert a digital tag 571 in the media content 134 (e.g., a media stream associated with the media playback) that indicates an instance of the media content when the user 102 left the vicinity of the device 110. For example, the media controller 126 can select a digital tag insert option 570 when the comparison result 144 indicates that the heartbeat patterns 140, 142 transitioned from alignment to misalignment. As a result of selecting the digital tag insert option 570, the digital tag 571 can be inserted in the media content 134 to identify the instance of the media content 134 when the user 102 left the vicinity of the device 110. When the processor 120 determines that the user 102 is back within the vicinity of the device 110 (e.g., when the comparison result 144 indicates that the heartbeat patterns 140, 142 transitioned from misalignment to alignment), the processor 120 can enable spatial audio rendering and resume playback of the media content 134 where the digital tag 571 was inserted.

Figure 6:
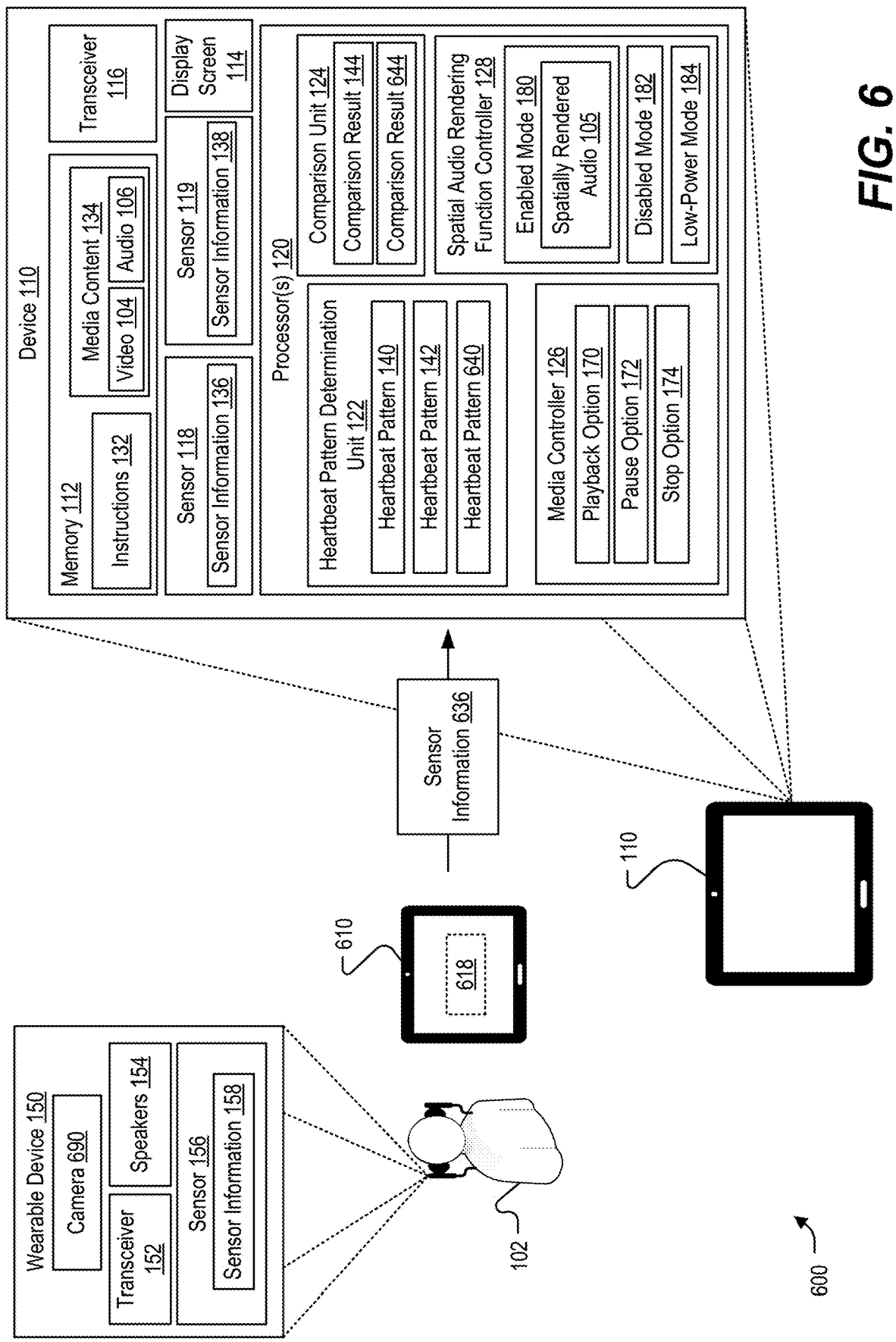
FIG. 6 is a block diagram of another particular illustrative aspect of a system configured to control spatial audio rendering based on detected heartbeat patterns, in accordance with some examples of the present disclosure.

Referring to FIG. 6, another particular illustrative aspect of a system configured to control spatial audio rendering based on detected heartbeat patterns is disclosed and generally designated 600. The system 600 includes the device 110, the wearable device 150, and a device 610.

The device 610 can correspond to a display device that has a substantially similar configuration as the device 110. In particular, a sensor 618 can be integrated into the device 610 and can generate sensor information 636. The sensor 618 corresponds to, for example, another mmWave radar sensor. Thus, the sensor information 636 can be determined based on reflected electromagnetic waves that are transmitted from the sensor 618. For example, the sensor 618 can transmit electromagnetic waves to a target (e.g., the user 102). The electromagnetic waves can be reflected from the target and measured by the sensor 618 to generate the sensor information 636. The device 610 can transmit the sensor information 636 to the device 110.

The heartbeat pattern determination unit 122 can be configured to determine a heartbeat pattern 640 of the target based on the sensor information 636 (e.g., based on deviations between originally transmitted electromagnetic waves and the reflected electromagnetic waves). The comparison unit 124 can compare the heartbeat pattern 640 to the heartbeat pattern 140 to generate a comparison result 644. The processor 120 can determine whether the user 102 is proximate to the device 610 based on the comparison between the heartbeat patterns 140, 640 (e.g., based on the comparison result 644). For example, if the comparison result 644 indicates that the heartbeat patterns 140, 640 are aligned, the processor 120 can determine that the user 102 is proximate to the device 610.

In response to a determination that the user 102 is proximate to the device 610, the processor 120 can be configured to modify the spatial audio rendering function to reflect media playback at the device 610. For example, the spatial audio rendering function controller 128 can perform spatial audio rendering on the audio 106 to generate the spatially rendered audio 105 that reflects media playback at the device 610 (as opposed to at the device 110).

According to some implementations, the processor 120 can determine that a signal-to-noise ratio of the sensor information 636 is greater than a signal-to-noise ratio of the sensor information 136. In these implementations, the processor 120 can determine that the user 102 is more proximate to the device 610 (than the device 110) and can modify the spatial audio rendering function to reflect media playback at the device 610.

As illustrated in FIG. 6, the wearable device 150 can optionally include a camera 690 (e.g., the always-on-camera). In some scenarios, the camera 690 can be integrated into a bone conducting glass. To illustrate, the wearable device 150 can correspond to a headset or a pair of glasses that includes bone conducting glass that is placed over the eyes of the user 102. In this scenario, by integrating the camera 690 into the bone conducting glass, the camera 690 can focus on where the user 102 is focusing. As a result, based on feedback from the camera 690, the processor 120 can determine whether the user 102 is focused on the device 110 or the device 610. In response to a determination that the user 102 is focused on the device 610, the processor 120 can modify the spatial audio rendering function to reflect media playback at the device 610.

Thus, the techniques described with respect to FIG. 6 enable spatial audio rendering to be modified to reflect media playback from different devices. For example, based on the proximity of the user 102 to a different device or based on a focus of the user 102, the processor 120 can modify the spatial audio rendering function to reflect media playback at a different device.

Figure 7:
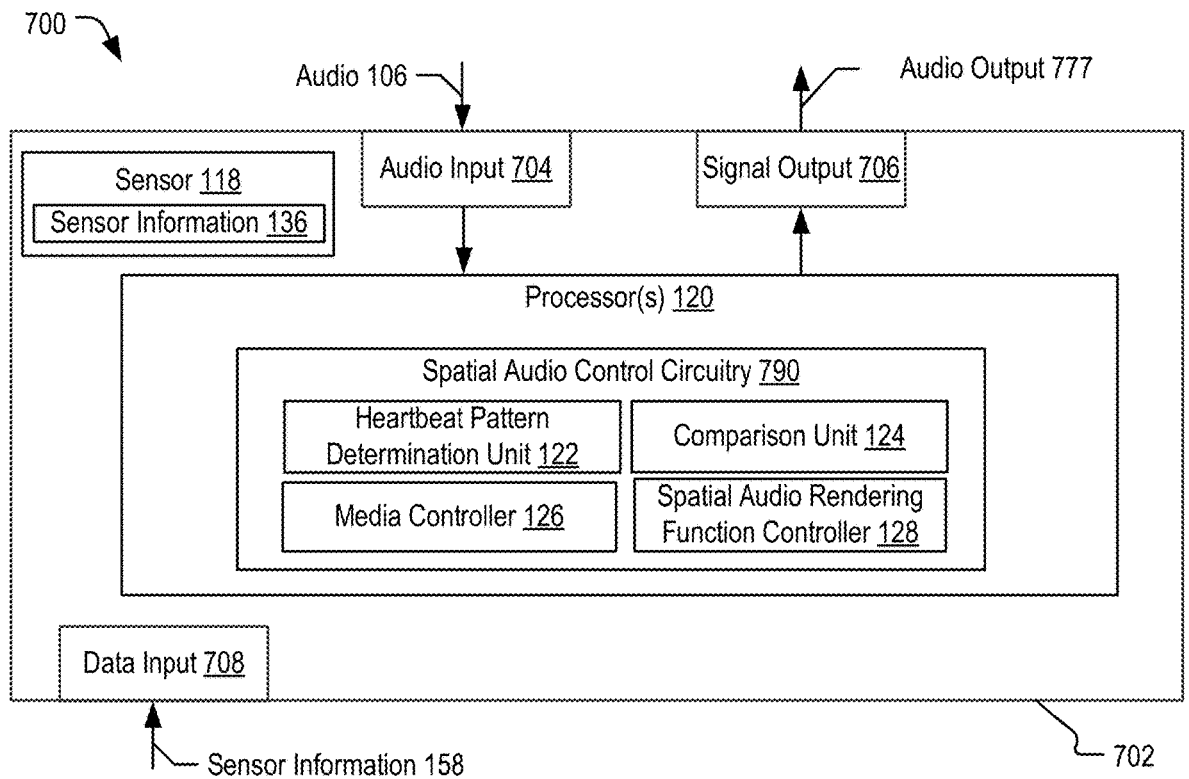
FIG. 7 illustrates an example of an integrated circuit that includes spatial audio rendering processing control circuitry, in accordance with some examples of the present disclosure.

FIG. 7 depicts an implementation 700 of an integrated circuit 702 that includes spatial audio control circuitry 790. For example, the integrated circuit 702 includes one or more processors 716. The one or more processors 716 can correspond to the one or more processors 120 of the device 110 or the device 310. The one or more processors 716 include the spatial audio control circuitry 790. The spatial audio control circuitry 790 can include at least one component of the processor 120. For example, the spatial audio control circuitry 790 can include the heartbeat pattern determination unit 122, the comparison unit 124, the media controller 126, and the spatial audio rendering function controller 128. In the example illustrated in FIG. 7, the integrated circuit 702 also includes the sensor 118 that is configured to generate the sensor information 136. Optionally, the sensor 118 is distinct from and coupled to the integrated circuit 702 (e.g., via an input 704). The integrated circuit 702 also includes an audio input 704, such as one or more bus interfaces, to enable the audio 106 to be received for processing. The integrated circuit 702 also includes a data input 708, such as one or more bus interfaces, to enable the sensor information 158 to be received for processing. In a similar manner as described above, based on the sensor information 136 and the sensor information 158, the spatial audio control circuitry 790 can determine whether to output the audio 106 or perform spatial audio rendering to output the spatially rendered audio 105. The integrated circuit 702 also includes a signal output 706, such as a bus interface, to enable sending of an audio output 777. The audio output 777 can correspond to the audio 106 or the spatially rendered audio 105. The integrated circuit 702 enables spatial audio rendering as a component in a system that includes a display screen, such as a mobile phone or tablet as depicted in FIG. 8.

Figure 8:
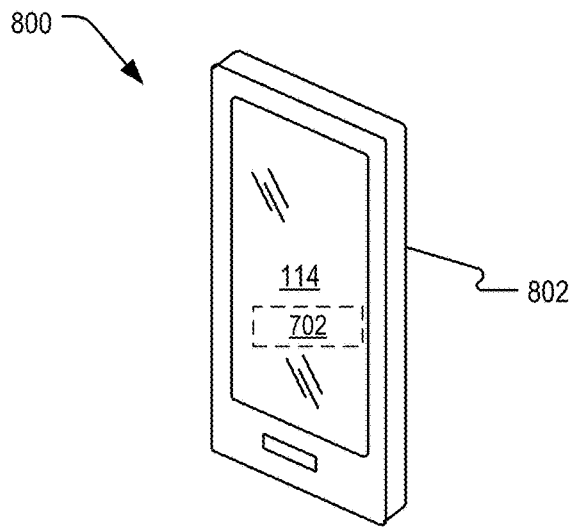
FIG. 8 is a diagram of a mobile device that includes spatial audio rendering processing control circuitry, in accordance with some examples of the present disclosure.

FIG. 8 depicts an implementation 800 in which the device 110 is a mobile device 802, such as a phone or tablet, as illustrative, non-limiting examples. The mobile device 802 includes the display screen 114. The integrated circuit 702 is integrated into the mobile device 802 and is illustrated using dashed lines to indicate internal components that are not generally visible to a user of the mobile device 802. In a particular example, the sensor 118 of the integrated circuit may function to generate the sensor information 136, as described above, and provide the sensor information 136 to the spatial audio control circuitry 790 of the integrated circuit 702. The spatial audio control circuitry 790 may function to determine the heartbeat pattern 142 of the user 102 based on the sensor information 136, determine the heartbeat pattern 140 of the user 102 based on sensor information 158 from a wearable device (e.g., the wearable device 150), and selectively enable spatial audio rendering to generate the spatially rendered audio 105 based on whether the heartbeat patterns 140, 142 are aligned. The spatially render audio can be transmitted to a wearable device (e.g., the wearable device 150) for playback.

Figure 9:
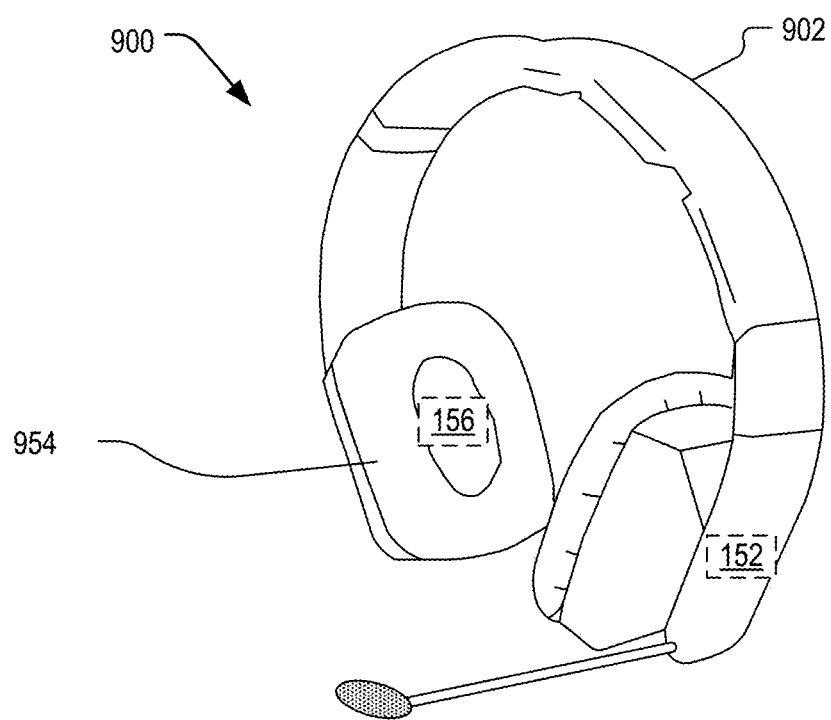
FIG. 9 is a diagram of a headset that includes a sensor that generates sensor information usable to detect a heartbeat pattern, in accordance with some examples of the present disclosure.

FIG. 9 depicts an implementation 900 in which the wearable device 150 is a headset device 902. The headset device 902 includes the sensor 156 that is configured to generate the sensor information 158 that is transmitted to the device 110 by the transceiver 152. The headset device 902 also includes headphone speakers 954 that can correspond to the speakers 154. The headphone speakers 954 can be configured to output the audio 106 or the spatially rendered audio 105 transmitted from the device 110.

Figure 10:
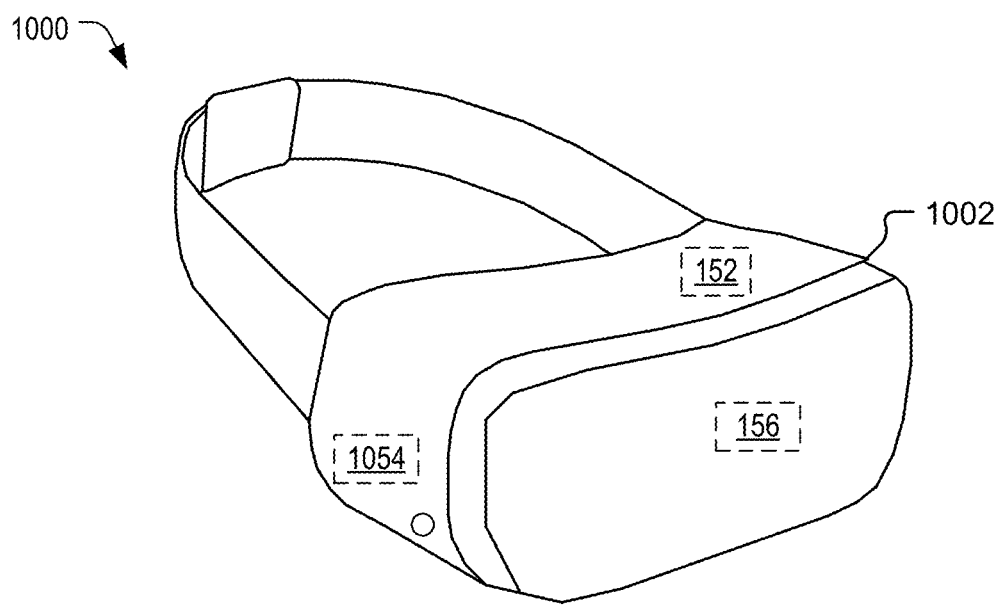
FIG. 10 is a diagram of a headset, such as a virtual reality, mixed reality, or augmented reality headset, that includes a sensor that generates sensor information usable to detect a heartbeat pattern, in accordance with some examples of the present disclosure.

FIG. 10 depicts an implementation 1000 in which the wearable device 150 includes a portable electronic device that corresponds to an extended reality ("XR") headset 1002, such as a virtual reality ("VR"), augmented reality ("AR"), or mixed reality ("MR") headset device. The headset 1002 includes the sensor 156 that is configured to generate the sensor information 158 that is transmitted to the device 110 by the transceiver 152. The headset 1002 also includes headphone speakers 1054 that can correspond to the speakers 154. The headphone speakers 1054 can be configured to output the audio 106 or the spatially rendered audio 105 transmitted from the device 110.

Figure 11:
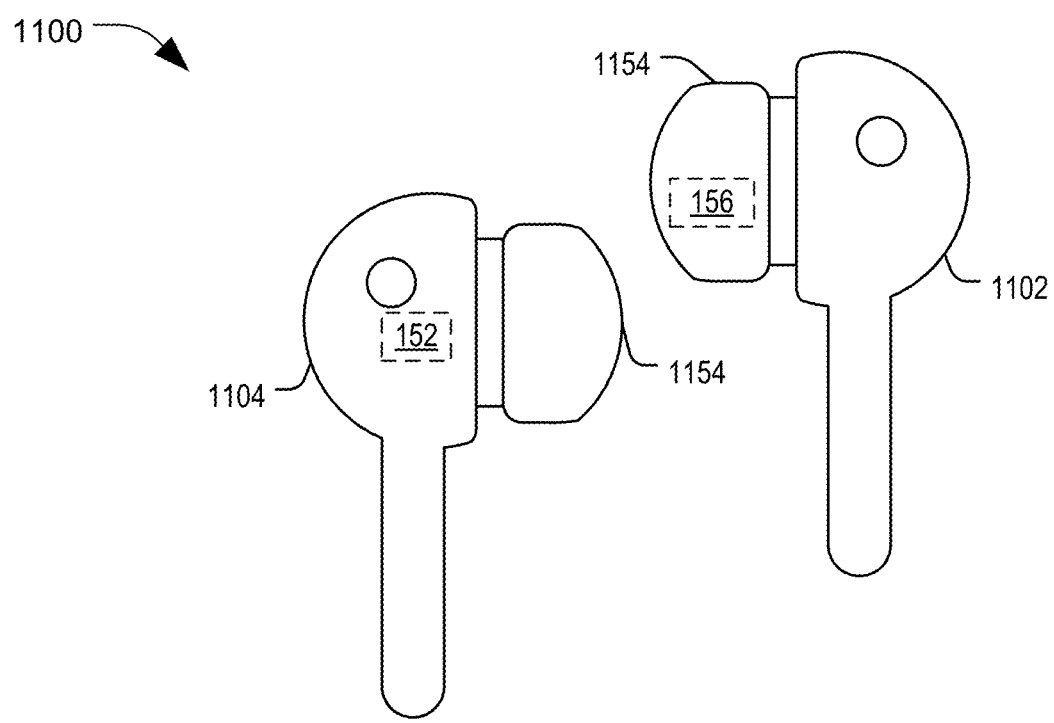
FIG. 11 is a diagram of ear buds that include a sensor that generates sensor information usable to detect a heartbeat pattern, in accordance with some examples of the present disclosure.

FIG. 11 is a diagram of ear buds 1100 (e.g., another particular example of the wearable device 150 of FIG. 1). In FIG. 11, a first ear bud 1102 includes the sensor 156 that is configured to generate the sensor information 158, and a second ear bud 1104 includes the transceiver 152 that is configured to transmit the sensor information 158 to the device 110. In other configurations, the sensor 156 and the transceiver 152 can be integrated into other components of the ear buds 1100. The ear buds 1100 also include speakers 1154 that can correspond to the speakers 154. The speakers 1154 can be configured to output the audio 106 or the spatially rendered audio 105 transmitted from the device 110.

Figure 12:
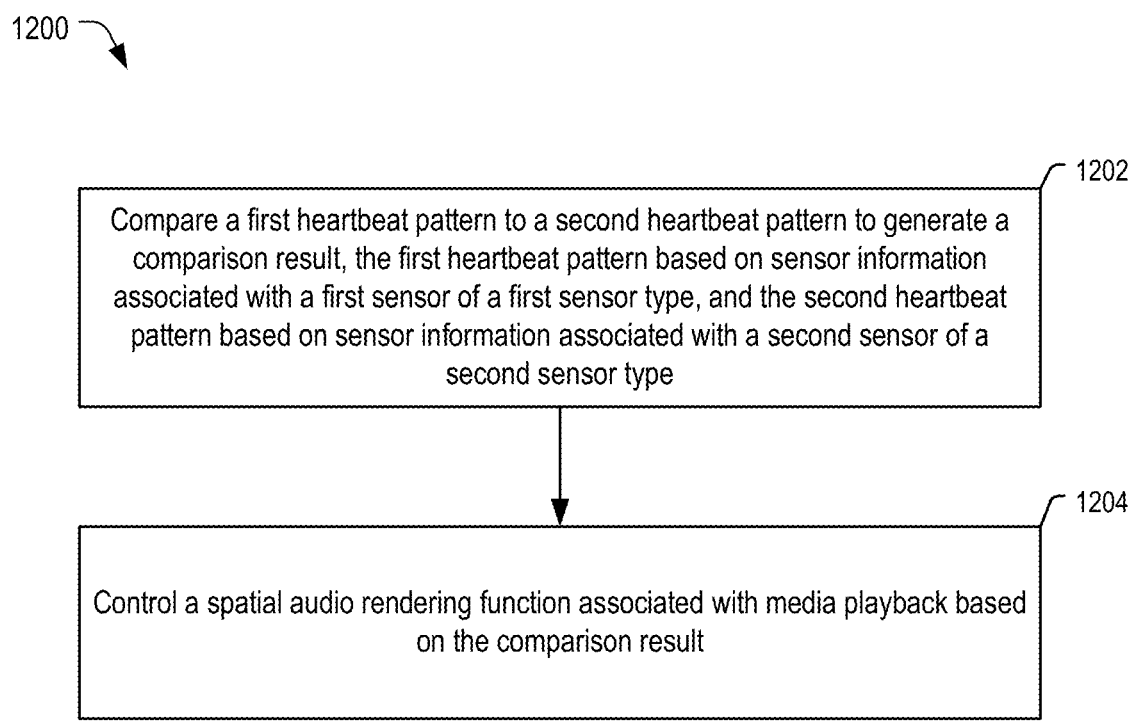
FIG. 12 is a diagram of a particular implementation of a method of controlling spatial audio rendering, in accordance with some examples of the present disclosure.

Referring to FIG. 12, a particular implementation of a method 1200 of controlling spatial audio rendering is shown. In a particular aspect, one or more operations of the method 1200 are performed by the device 110, the device 310, the spatial audio control circuitry 790, the mobile device 802, or a combination thereof.

The method 1200 includes comparing a first heartbeat pattern to a second heartbeat pattern to generate a comparison result, at block 1202. The first heartbeat pattern is based on sensor information associated with a first sensor of a first sensor type, and the second heartbeat pattern is based on sensor information associated with a second sensor of a second sensor type. For example, referring to FIG. 1, the comparison unit 124 compares the heartbeat pattern 140 to the heartbeat pattern 142 to generate the comparison result 144. The heartbeat pattern 140 is based on the sensor information 158 associated with the sensor 156 of a first sensor type, and the heartbeat pattern 142 is based on the sensor information 136 associated with the sensor 118 of the second sensor type. According to one implementation, the second sensor type (e.g., a mmWave radar sensor) is distinct from the first sensor type (e.g., a PPG sensor). For example, the sensor information 158 associated with the sensor 156 can be based on measured light reflections indicative of blood volume variations associated with the user 102. In this example, the sensor information 136 associated with the sensor 118 can be determined based on reflected electromagnetic waves that are transmitted from the sensor 118.

The method 1200 also includes controlling a spatial audio rendering function associated with media playback based on the comparison result, at block 1204. For example, referring to FIG. 1, the spatial audio rendering function controller 128 can enable the use of the spatial audio rendering function in response to the comparison result 144 indicating that the heartbeat patterns 140, 142 are within the alignment threshold. As another example, the spatial audio rendering function controller 128 can disable use of the spatial audio rendering function (or transition the spatial audio rendering function to operate in a low-power mode) in response to the comparison result 144 indicating that the heartbeat patterns 140, 142 are not within the alignment threshold.

The method 1200 of FIG. 12 enables the use of cardiovascular activity (e.g., the determined heartbeat patterns 140, 142) to determine whether the user 102 is in front of the display screen 114. Based on the determination, the method 1200 can selectively enable or disable spatial audio rendering. For example, spatial audio rendering can be enabled in response to a determination that the user 102 is in front of the display screen 114 to increase user enjoyment while listening to the media content 134, and spatial audio rendering can be disabled in response to a determination that the user 102 is not in front of the display screen 114 to conserve power. Using cardiovascular activity to determine whether the user 102 is in front of the display screen 114 increases user privacy compared to vision-based approaches. For example, using a vision-based approach (e.g., cameras) to determine whether the user 102 is in front of the display screen 114 may require the use of high-resolution cameras, which could be a privacy concern. By determining whether the user 102 is in front of the display screen 114 based on a comparison of the heartbeat patterns 140, 142, privacy concerns associated with cameras can be alleviated.

Additionally, using cardiovascular activity to determine whether the user 102 is in front of the display screen 114 decreases the likelihood of false positives. To illustrate, the use of low-resolution cameras or ultrasounds to determine whether the user 102 is in front of the display screen 114 could result in false positives. For example, if a low-resolution image captures a person in front of the display screen 114 other than user 102, the person could mistakenly be identified as the user and spatial audio rendering may be enabled when the user 102 is not in front of the display screen 114, causing an increase in power consumption. By comparing the heartbeat patterns 140, 142, the likelihood of a mistaken identity can be significantly decreased.

Additionally, while activity recognition can be used to determine whether the user 102 is in front of the display screen 114, activity recognition can also be prone to false negatives. For example, if the user 102 begins to walk on a treadmill in front of the display screen 114 while the device 110 is stationary, an activity recognition approach may result in a determination that the user is no longer in front of the display screen 114 because of a detected increase in user activity (e.g., walking). However, using cardiovascular activity, as described above, reduces the likelihood of false negatives because the determination is based on a comparison of the heartbeat patterns 140, 142.

Figure 13:
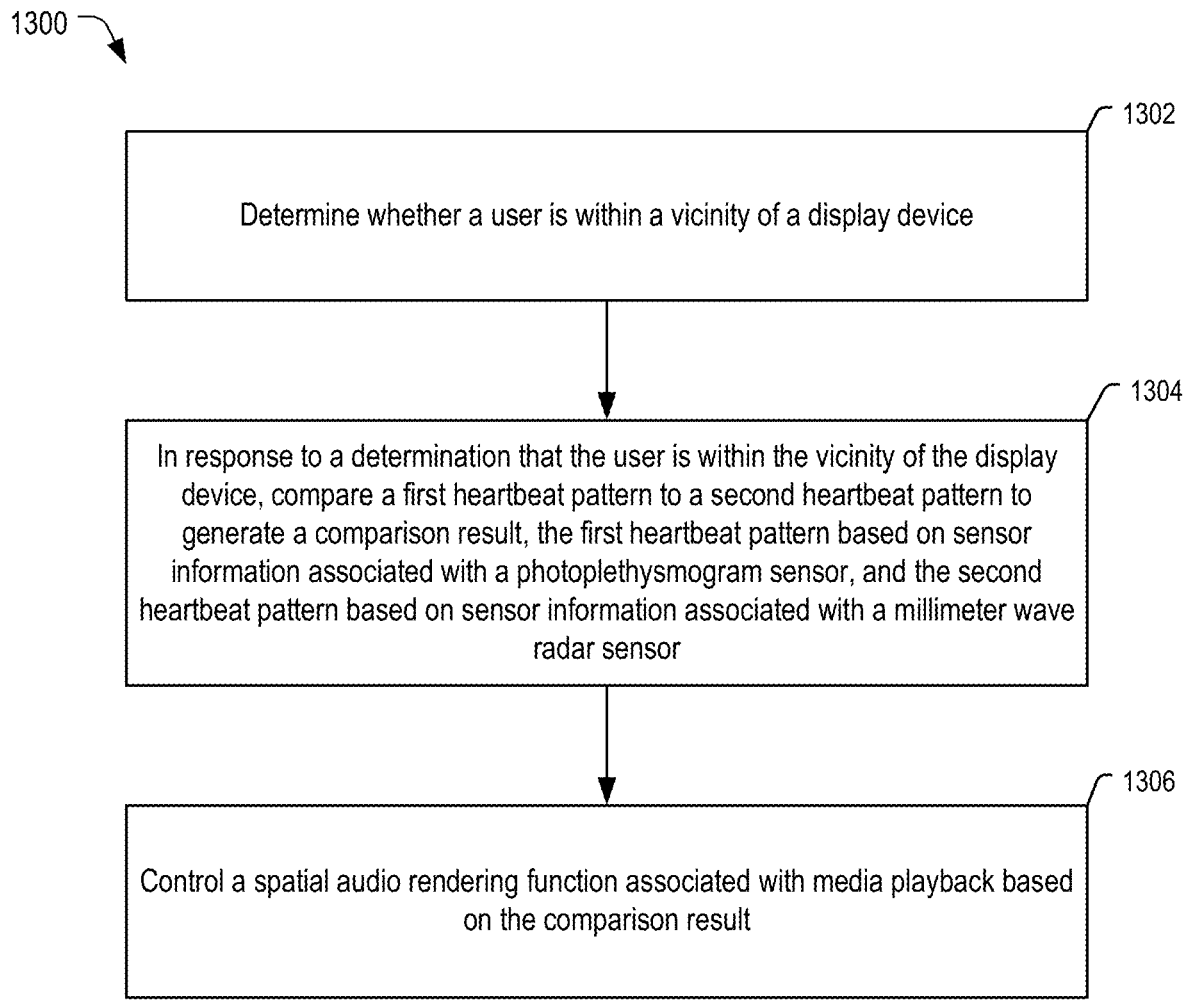
FIG. 13 is a diagram of another particular implementation of a method of controlling spatial audio rendering, in accordance with some examples of the present disclosure.

Referring to FIG. 13, another particular implementation of a method 1300 of controlling spatial audio rendering is shown. In a particular aspect, one or more operations of the method 1300 are performed by the device 110, the device 310, the spatial audio control circuitry 790, the mobile device 802, or a combination thereof.

The method 1300 includes determining whether a user is within a vicinity of a display device, at block 1302. For example, referring to FIG. 1, the sensor 119 can generate sensor information 138 that indicates whether a person is within the vicinity of the device 110. To illustrate, the sensor 119 can include a camera (e.g., a low-power camera) that captures images of a surrounding environment of the device 110. In this scenario, the captured images can correspond to the sensor information 138 and the processor 120 can perform object detection, object recognition, or both, on the captured images to determine whether a person is within the vicinity of the device 110. Additionally, or in the alternative, the sensor 119 can include a microphone that captures audio of the surrounding environment. In this scenario, the captured audio can correspond to the sensor information 138 and the processor 120 can process the audio to determine whether a person is within the vicinity of the device 110.

The method 1300 also includes, in response to a determination that the user is within a vicinity of the display device, comparing a first heartbeat pattern to a second heartbeat pattern to generate a comparison result, at block 1304. The first heartbeat pattern is based on sensor information associated with a PPG sensor, and the second heartbeat pattern is based on sensor information associated with a mmWave radar sensor. For example, referring to FIG. 1, the comparison unit 124 compares the heartbeat pattern 140 to the heartbeat pattern 142 to generate the comparison result 144. The heartbeat pattern 140 is based on the sensor information 158 associated with the sensor 156 of a first sensor type, and the heartbeat pattern 142 is based on the sensor information 136 associated with the sensor 118 of the second sensor type.

The method 1300 also includes controlling a spatial audio rendering function associated with media playback based on the comparison result, at block 1306. For example, referring to FIG. 1, the spatial audio rendering function controller 128 can enable the use of the spatial audio rendering function in response to the comparison result 144 indicating that the heartbeat patterns 140, 142 are within the alignment threshold. As another example, the spatial audio rendering function controller 128 can disable use of the spatial audio rendering function (or transition the spatial audio rendering function to operate in a low-power mode) in response to the comparison result 144 indicating that the heartbeat patterns 140, 142 are not within the alignment threshold.

The methods 1200, 1300 may be implemented by a field-programmable gate array (FPGA) device, an application-specific integrated circuit (ASIC), a processing unit such as a central processing unit (CPU), a digital signal processing unit (DSP), a controller, another hardware device, firmware device, or any combination thereof. As an example, the methods 1200, 1300 may be performed by a processor that executes instructions, such as described with reference to FIG. 14.

Figure 14:
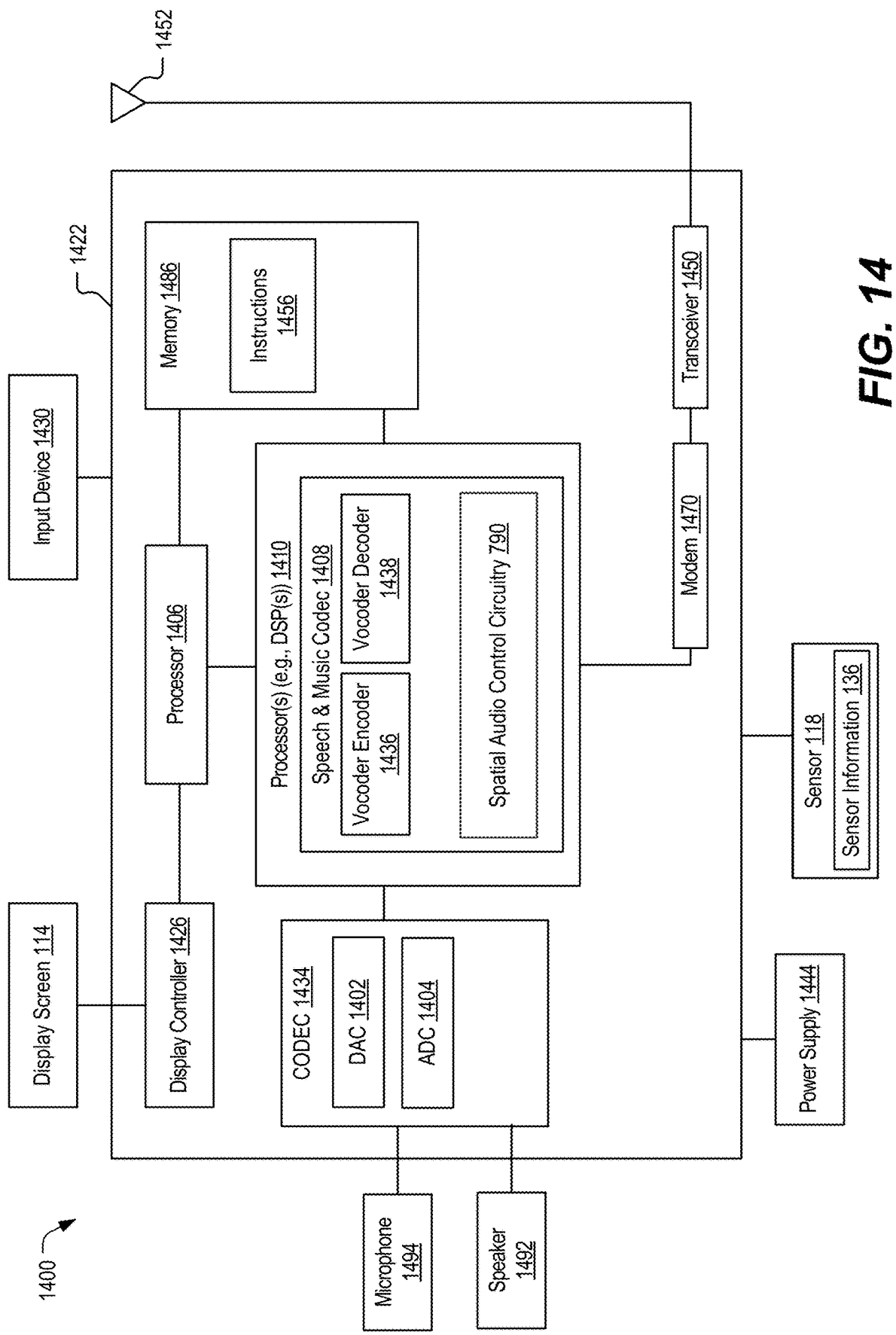
FIG. 14 is a block diagram of a particular illustrative example of a device that is operable to control spatial audio rendering based on detected heartbeat patterns, in accordance with some examples of the present disclosure.

Referring to FIG. 14, a block diagram of a particular illustrative implementation of a device is depicted and generally designated 1400. In various implementations, the device 1400 may have more or fewer components than illustrated in FIG. 14. In an illustrative implementation, the device 1400 may correspond to the device 110, the device 310, or both. In an illustrative implementation, the device 1400 may perform one or more operations described with reference to FIGS. 1-13.

In a particular implementation, the device 1400 includes a processor 1406 (e.g., a CPU). The device 1400 may include one or more additional processors 1410 (e.g., one or more DSPs). In a particular aspect, the processor(s) 120 corresponds to the processor 1406, the processors 1410, or a combination thereof. The processors 1410 may include a speech and music coder-decoder (CODEC) 1408 that includes a voice coder ("vocoder") encoder 1436, a vocoder decoder 1438, the spatial audio control circuitry 790, or a combination thereof.

The device 1400 may include a memory 1486 and a CODEC 1434. The memory 1486 may include instructions 1456, that are executable by the one or more additional processors 1410 (or the processor 1406) to implement the functionality described with reference to the spatial audio control circuitry 790. In a particular aspect, the memory 1486 corresponds to the memory 112. In a particular aspect, the instructions 1456 include the instructions 132. The device 1400 may include a modem 1470 coupled, via a transceiver 1450, to an antenna 1452. The modem 1470 may be configured to transmit a signal to a second device, such as the wearable device 150 of FIG. 1, and receive data from the second device, such as the sensor information 158.

The device 1400 may include the display screen 114 coupled to a display controller 1426. A speaker 1492 and a microphone 1494 may be coupled to the CODEC 1434. The CODEC 1434 may include a digital-to-analog converter (DAC) 1402, an analog-to-digital converter (ADC) 1404, or both. In a particular implementation, the CODEC 1434 may receive analog signals from the microphone 1494, convert the analog signals to digital signals using the analog-to-digital converter 1404, and provide the digital signals to the speech and music codec 1408. The speech and music codec 1408 may process the digital signals, and the digital signals may further be processed by the spatial audio control circuitry 790. In a particular implementation, the speech and music codec 1408 may provide digital signals to the CODEC 1434. The CODEC 1434 may convert the digital signals to analog signals using the digital-to-analog converter 1402 and may provide the analog signals to the speaker 1492.

In a particular implementation, the device 1400 may be included in a system-in-package or system-on-chip device 1422. In a particular implementation, the memory 1486, the processor 1406, the processors 1410, the display controller 1426, the CODEC 1434, the modem 1470, and the transceiver 1450 are included in a system-in-package or system-on-chip device 1422. In a particular implementation, an input device 1430, a power supply 1444, and the sensor 118 are coupled to the system-on-chip device 1422. Moreover, in a particular implementation, as illustrated in FIG. 14, the display screen 114, the input device 1430, the speaker 1492, the microphone 1494, the antenna 1452, the sensor 118, and the power supply 1444 are external to the system-in-package or system-on-chip device 1422. In a particular implementation, each of the display screen 114, the input device 1430, the speaker 1492, the microphone 1494, the antenna 1452, the sensor 118, and the power supply 1444 may be coupled to a component of the system-in-package or system-on-chip device 1422, such as an interface or a controller.

The device 1400 may include a mobile communication device, a smart phone, a cellular phone, a laptop computer, a computer, a tablet, a personal digital assistant, a display device, a television, a digital video player, a digital video disc (DVD) player, a voice-activated device, a portable electronic device, a computing device, a communication device, an internet-of-things (IoT) device, a virtual reality (VR) device, a mobile device, or any combination thereof.

In conjunction with the described implementations, an apparatus includes means for comparing a first heartbeat pattern to a second heartbeat pattern to generate a comparison result. The first heartbeat pattern is based on sensor information associated with a first sensor of a first sensor type, and the second heartbeat pattern is based on sensor information associated with a second sensor of a second sensor type. For example, the means for comparing include the processor 120, the comparison unit 124, the spatial audio control circuitry 790, the one or more processors 1410, one or more other circuits or components configured to compare the first heartbeat pattern to the second heartbeat pattern to generate the comparison result, or any combination thereof.

The apparatus also includes means for controlling a spatial audio rendering function associated with media playback based on the comparison result. For example, the means for controlling include the processor 120, the spatial audio rendering function controller 128, the spatial audio control circuitry 790, the one or more processors 1410, one or more other circuits or components configured to control the spatial audio rendering function, or any combination thereof.

In some implementations, a non-transitory computer-readable medium (e.g., a computer-readable storage device, such as the memory 1486) includes instructions (e.g., the instructions 1456) that, when executed by one or more processors (e.g., the one or more processors 1410 or the processor 1406), cause the one or more processors to compare a first heartbeat pattern (e.g., the heartbeat pattern 140) to a second heartbeat pattern (e.g., the heartbeat pattern 142) to generate a comparison result (e.g., the comparison result 144). The first heartbeat pattern can be based on sensor information (e.g., the sensor information 158) associated with a first sensor (e.g., the sensor 156) of a first sensor type, and the second heartbeat pattern can be based on sensor information (e.g., the sensor information 136) associated with a second sensor (e.g., the sensor 118) of a second sensor type. The instructions, when executed by the one or more processors, also cause the one or more processors to control a spatial audio rendering function associated with media playback based on the comparison result.

This disclosure includes the following examples.

Example 1 includes a device comprising: a memory configured to store instructions; and one or more processors configured to execute the instructions to: compare a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and based on the comparison result, control a spatial audio rendering function associated with media playback.

Example 2 includes the device of example 1, wherein the second sensor type is distinct from the first sensor type.

Example 3 includes the device of any of examples 1 to 2, wherein the sensor information associated with the first sensor comprises measured light reflections indicative of blood volume variations associated with a user, and wherein the first sensor comprises a photoplethysmogram (PPG) sensor.

Example 4 includes the device of any of examples 1 to 3, wherein the sensor information associated with the second sensor is determined based on reflected electromagnetic waves that are transmitted from the second sensor, wherein the second sensor comprises a millimeter wave (mmWave) radar sensor.

Example 5 includes the device of any of examples 1 to 4, wherein, in response to the comparison result indicating that the first heartbeat pattern is within an alignment threshold of the second heartbeat pattern, the one or more processors are further configured to execute the instructions to enable use of the spatial audio rendering function.

Example 6 includes the device of any of examples 1 to 5, wherein, in response to the comparison result indicating that the first heartbeat pattern is not within an alignment threshold of the second heartbeat pattern, the one or more processors are further configured to execute the instructions to disable use of the spatial audio rendering function.

Example 7 includes the device of any of examples 1 to 6, wherein, in response to the comparison result indicating that the first heartbeat pattern is not within an alignment threshold of the second heartbeat pattern, the one or more processors are further configured to execute the instructions to transition the spatial audio rendering function to operate in a low-power mode.

Example 8 includes the device of any of examples 1 to 7, wherein the first sensor is integrated into a wearable device worn by a user, and wherein the second sensor is integrated into a display device that is configured to display media content associated with the media playback.

Example 9 includes the device of any of examples 1 to 8, wherein the wearable device comprises earpieces.

Example 10 includes the device of any of examples 1 to 9, wherein the one or more processors are further configured to execute the instructions to: determine whether the user is within a vicinity of the display device based on additional sensor information, wherein the first heartbeat pattern is compared to the second heartbeat pattern in response to a determination that the user is in the vicinity of the display device.

Example 11 includes the device of any of examples 1 to 10, wherein the one or more processors are further configured to execute the instructions to: determine that a second user is within a vicinity of the display device based on sensor information associated with another sensor integrated into the display device; determine whether the second user is speaking based on additional sensor information; and disable an environmental feedback function at the wearable device in response to a determination that the second user is speaking.

Example 12 includes the device of any of examples 1 to 11, wherein the one or more processors are further configured to execute the instructions to: determine that a second user is within a vicinity of the display device based on sensor information associated with another sensor integrated into the display device; determine whether the second user is speaking based on additional sensor information; and pause media playback in response to a determination that the second user is speaking, wherein a head tracking operation associated with the spatial audio rendering function continues while the media playback is paused.

Example 13 includes the device of any of examples 1 to 12, wherein another sensor is integrated into a second wearable device, and wherein the one or more processors are further configured to execute the instructions to: distinguish the wearable device from the second wearable device based on the comparison result.

Example 14 includes the device of any of examples 1 to 13, wherein the one or more processors are further configured to execute the instructions to: determine, based on the comparison result, that the user is not within a vicinity of the display device; and in response to a determination that the user is not within the vicinity of the display device: disable use of the spatial audio rendering function; and insert a digital tag in a media stream associated with the media playback, the digital tag indicating an instance of the media stream when the user left the vicinity of the display device.

Example 15 includes the device of any of examples 1 to 14, wherein the one or more processors are further configured to execute the instructions to: receive, from a second display device, sensor information associated with another sensor that is integrated into the second display device; determine that the user is proximate to the second display device based on a comparison between the first heartbeat pattern and a third heartbeat pattern, the third heartbeat pattern based on the sensor information associated with the other sensor; and in response to a determination that the user is proximate to the second display device: modify the spatial audio rendering function to reflect media playback at the second display device in response to a determination that a signal-to-noise ratio of the sensor information associated with the other sensor is greater than a signal-to-noise ratio of the sensor information associated with the second sensor.

Example 16 includes the device of any of examples 1 to 15, wherein a camera is integrated into the wearable device, and wherein the one or more processors are further configured to execute the instructions to: determine, based on feedback from the camera, that the user is focused on a second display device; and modify the spatial audio rendering function to reflect media playback at the second display device in response to a determination that the user is focused on the second display device.

Example 17 includes the device of any of examples 1 to 16, further comprising a modem coupled to the one or more processors, the modem configured to receive media content for the media playback, receive the sensor information associated with the first sensor, or a combination thereof.

Example 18 incudes a method of controlling spatial audio rendering, the method comprising: comparing a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and based on the comparison result, controlling a spatial audio rendering function associated with media playback.

Example 19 includes the method of example 18, wherein the second sensor type is distinct from the first sensor type.

Example 20 includes the method of any of examples 18 to 19, wherein the sensor information associated with the first sensor comprises measured light reflections indicative of blood volume variations associated with a user, and wherein the first sensor comprises a photoplethysmogram (PPG) sensor.

Example 21 includes the method of any of examples 18 to 20, wherein the sensor information associated with the second sensor is determined based on reflected electromagnetic waves that are transmitted from the second sensor, wherein the second sensor comprises a millimeter wave (mmWave) radar sensor.

Example 22 includes the method of any of examples 18 to 21, wherein controlling the spatial audio rendering function comprises enabling use of the spatial audio rendering function in response to the comparison result indicating that the first heartbeat pattern is within an alignment threshold of the second heartbeat pattern.

Example 23 includes the method of any of examples 18 to 22, wherein controlling the spatial audio rendering function comprises disabling use of the spatial audio rendering function in response to the comparison result indicating that the first heartbeat pattern is not within an alignment threshold of the second heartbeat pattern.

Example 24 includes the method of any of examples 18 to 23, wherein controlling the spatial audio rendering function comprises transitioning the spatial audio rendering function to operate in a low-power mode in response to the comparison result indicating that the first heartbeat pattern is not within an alignment threshold of the second heartbeat pattern.

Example 25 includes the method of any of examples 18 to 24, wherein the first sensor is integrated into a wearable device worn by a user, and wherein the second sensor is integrated into a display device that is configured to display media content associated with the media playback.

Example 26 includes the method of any of examples 18 to 25, wherein the wearable device comprises earpieces.

Example 27 includes the method of any of examples 18 to 26, further comprising determining whether the user is within a vicinity of the display device based on additional sensor information, wherein the first heartbeat pattern is compared to the second heartbeat pattern in response to a determination that the user is in the vicinity of the display device.

Example 28 includes the method of any of examples 18 to 27, further comprising: determining that a second user is within a vicinity of the display device based on sensor information associated with another sensor integrated into the display device; determining whether the second user is speaking based on additional sensor information; and disabling an environmental feedback function at the wearable device in response to a determination that the second user is speaking.

Example 29 includes the method of any of examples 18 to 28, further comprising: determining that a second user is within a vicinity of the display device based on sensor information associated with another sensor integrated into the display device; determining whether the second user is speaking based on additional sensor information; and pausing media playback in response to a determination that the second user is speaking, wherein a head tracking operation associated with the spatial audio rendering function continues while the media playback is paused.

Example 30 includes the method of any of examples 18 to 29, wherein another sensor is integrated into a second wearable device, and further comprising: distinguishing the wearable device from the second wearable device based on the comparison result.

Example 31 includes the method of any of examples 18 to 30, further comprising: determining, based on the comparison result, that the user is not within a vicinity of the display device; and in response to a determination that the user is not within the vicinity of the display device: disabling use of the spatial audio rendering function; and inserting a digital tag in a media stream associated with the media playback, the digital tag indicating an instance of the media stream when the user left the vicinity of the display device.

Example 32 includes the method of any of examples 18 to 31, further comprising: receiving, from a second display device, sensor information associated with another sensor that is integrated into the second display device; determining that the user is proximate to the second display device based on a comparison between the first heartbeat pattern and a third heartbeat pattern, the third heartbeat pattern based on the sensor information associated with the other sensor; and in response to a determination that the user is proximate to the second display device: modifying the spatial audio rendering function to reflect media playback at the second display device in response to a determination that a signal-to-noise ratio of the sensor information associated with the other sensor is greater than a signal-to-noise ratio of the sensor information associated with the second sensor.

Example 33 includes the method of any of examples 18 to 32, wherein a camera is integrated into the wearable device, and further comprising: determining, based on feedback from the camera, that the user is focused on a second display device; and modifying the spatial audio rendering function to reflect media playback at the second display device in response to a determination that the user is focused on the second display device.

Example 34 includes a non-transitory computer-readable medium comprising instructions that, when executed by one or more processors, cause the one or more processors to: compare a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and based on the comparison result, control a spatial audio rendering function associated with media playback.

Example 35 includes the non-transitory computer-readable medium of example 34, wherein the second sensor type is distinct from the first sensor type.

Example 36 includes the non-transitory computer-readable medium of any of examples 34 to 35, wherein the sensor information associated with the first sensor comprises measured light reflections indicative of blood volume variations associated with a user, and wherein the first sensor comprises a photoplethysmogram (PPG) sensor.

Example 37 includes the non-transitory computer-readable medium of any of examples 34 to 36, wherein the sensor information associated with the second sensor is determined based on reflected electromagnetic waves that are transmitted from the second sensor, wherein the second sensor comprises a millimeter wave (mmWave) radar sensor.

Example 38 includes the non-transitory computer-readable medium of any of examples 34 to 37, wherein, in response to the comparison result indicating that the first heartbeat pattern is within an alignment threshold of the second heartbeat pattern, the one or more processors are further configured to execute the instructions to enable use of the spatial audio rendering function.

Example 39 includes the non-transitory computer-readable medium of any of examples 34 to 38, wherein, in response to the comparison result indicating that the first heartbeat pattern is not within an alignment threshold of the second heartbeat pattern, the one or more processors are further configured to execute the instructions to disable use of the spatial audio rendering function.

Example 40 includes the non-transitory computer-readable medium of any of examples 34 to 39, wherein, in response to the comparison result indicating that the first heartbeat pattern is not within an alignment threshold of the second heartbeat pattern, the one or more processors are further configured to execute the instructions to transition the spatial audio rendering function to operate in a low-power mode.

Example 41 includes the non-transitory computer-readable medium of any of examples 34 to 40, wherein the first sensor is integrated into a wearable device worn by a user, and wherein the second sensor is integrated into a display device that is configured to display media content associated with the media playback.

Example 42 includes the non-transitory computer-readable medium of any of examples 34 to 41, wherein the wearable device comprises earpieces.

Example 43 includes the non-transitory computer-readable medium of any of examples 34 to 42, wherein the one or more processors are further configured to execute the instructions to: determine whether the user is within a vicinity of the display device based on additional sensor information, wherein the first heartbeat pattern is compared to the second heartbeat pattern in response to a determination that the user is in the vicinity of the display device.

Example 44 includes the non-transitory computer-readable medium of any of examples 34 to 43, wherein the one or more processors are further configured to execute the instructions to: determine that a second user is within a vicinity of the display device based on sensor information associated with another sensor integrated into the display device; determine whether the second user is speaking based on additional sensor information; and disable an environmental feedback function at the wearable device in response to a determination that the second user is speaking.

Example 45 includes the non-transitory computer-readable medium of any of examples 34 to 44, wherein the one or more processors are further configured to execute the instructions to: determine that a second user is within a vicinity of the display device based on sensor information associated with another sensor integrated into the display device; determine whether the second user is speaking based on additional sensor information; and pause media playback in response to a determination that the second user is speaking, wherein a head tracking operation associated with the spatial audio rendering function continues while the media playback is paused.

Example 46 includes the non-transitory computer-readable medium of any of examples 34 to 45, wherein another sensor is integrated into a second wearable device, and wherein the one or more processors are further configured to execute the instructions to: distinguish the wearable device from the second wearable device based on the comparison result.

Example 47 includes the non-transitory computer-readable medium of any of examples 34 to 46, wherein the one or more processors are further configured to execute the instructions to: determine, based on the comparison result, that the user is not within a vicinity of the display device; and in response to a determination that the user is not within the vicinity of the display device: disable use of the spatial audio rendering function; and insert a digital tag in a media stream associated with the media playback, the digital tag indicating an instance of the media stream when the user left the vicinity of the display device.

Example 48 includes the non-transitory computer-readable medium of any of examples 34 to 47, wherein the one or more processors are further configured to execute the instructions to: receive, from a second display device, sensor information associated with another sensor that is integrated into the second display device; determine that the user is proximate to the second display device based on a comparison between the first heartbeat pattern and a third heartbeat pattern, the third heartbeat pattern based on the sensor information associated with the other sensor; and in response to a determination that the user is proximate to the second display device: modify the spatial audio rendering function to reflect media playback at the second display device in response to a determination that a signal-to-noise ratio of the sensor information associated with the other sensor is greater than a signal-to-noise ratio of the sensor information associated with the second sensor.

Example 49 includes the non-transitory computer-readable medium of any of examples 34 to 48, wherein a camera is integrated into the wearable device, and wherein the one or more processors are further configured to execute the instructions to: determine, based on feedback from the camera, that the user is focused on a second display device; and modify the spatial audio rendering function to reflect media playback at the second display device in response to a determination that the user is focused on the second display device.

Example 50 includes an apparatus comprising: means for comparing a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and means for controlling a spatial audio rendering function associated with media playback based on the comparison result.

Example 51 includes the apparatus of example 50, wherein the second sensor type is distinct from the first sensor type.

Example 52 includes the apparatus of any of examples 50 to 51, wherein the sensor information associated with the first sensor comprises measured light reflections indicative of blood volume variations associated with a user, and wherein the first sensor comprises a photoplethysmogram (PPG) sensor.

Example 53 includes the apparatus of any of examples 50 to 52, wherein the sensor information associated with the second sensor is determined based on reflected electromagnetic waves that are transmitted from the second sensor, wherein the second sensor comprises a millimeter wave (mmWave) radar sensor.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a memory configured to store instructions; and
   one or more processors configured to execute the instructions to:
   compare a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and
   based on the comparison result, control a spatial audio rendering function associated with media playback.

2. The device of claim 1, wherein the second sensor type is distinct from the first sensor type.

3. The device of claim 1, wherein the sensor information associated with the first sensor comprises measured light reflections indicative of blood volume variations associated with a user, and wherein the first sensor comprises a photoplethysmogram (PPG) sensor.

4. The device of claim 1, wherein the sensor information associated with the second sensor is determined based on reflected electromagnetic waves that are transmitted from the second sensor, wherein the second sensor comprises a millimeter wave (mmWave) radar sensor.

5. The device of claim 1, wherein, in response to the comparison result indicating that the first heartbeat pattern is within an alignment threshold of the second heartbeat pattern, the one or more processors are further configured to execute the instructions to enable use of the spatial audio rendering function.

6. The device of claim 1, wherein, in response to the comparison result indicating that the first heartbeat pattern is not within an alignment threshold of the second heartbeat pattern, the one or more processors are further configured to execute the instructions to disable use of the spatial audio rendering function.

7. The device of claim 1, wherein, in response to the comparison result indicating that the first heartbeat pattern is not within an alignment threshold of the second heartbeat pattern, the one or more processors are further configured to execute the instructions to transition the spatial audio rendering function to operate in a low-power mode.

8. The device of claim 1, wherein the first sensor is integrated into a wearable device worn by a user, and wherein the second sensor is integrated into a display device that is configured to display media content associated with the media playback.

9. The device of claim 8, wherein the wearable device comprises earpieces.

10. The device of claim 8, wherein the one or more processors are further configured to execute the instructions to:
    determine whether the user is within a vicinity of the display device based on additional sensor information, wherein the first heartbeat pattern is compared to the second heartbeat pattern in response to a determination that the user is in the vicinity of the display device.

11. The device of claim 8, wherein the one or more processors are further configured to execute the instructions to:
    determine that a second user is within a vicinity of the display device based on sensor information associated with another sensor integrated into the display device;
    determine whether the second user is speaking based on additional sensor information; and
    disable an environmental feedback function at the wearable device in response to a determination that the second user is speaking.

12. The device of claim 8, wherein the one or more processors are further configured to execute the instructions to:
    determine that a second user is within a vicinity of the display device based on sensor information associated with another sensor integrated into the display device;
    determine whether the second user is speaking based on additional sensor information; and
    pause media playback in response to a determination that the second user is speaking, wherein a head tracking operation associated with the spatial audio rendering function continues while the media playback is paused.

13. The device of claim 8, wherein another sensor is integrated into a second wearable device, and wherein the one or more processors are further configured to execute the instructions to:
    distinguish the wearable device from the second wearable device based on the comparison result.

14. The device of claim 8, wherein the one or more processors are further configured to execute the instructions to:
- determine, based on the comparison result, that the user is not within a vicinity of the display device; and
- in response to a determination that the user is not within the vicinity of the display device:
  - disable use of the spatial audio rendering function; and
  - insert a digital tag in a media stream associated with the media playback, the digital tag indicating an instance of the media stream when the user left the vicinity of the display device.

15. The device of claim 8, wherein the one or more processors are further configured to execute the instructions to:
- receive, from a second display device, sensor information associated with another sensor that is integrated into the second display device;
- determine that the user is proximate to the second display device based on a comparison between the first heartbeat pattern and a third heartbeat pattern, the third heartbeat pattern based on the sensor information associated with the other sensor; and
- in response to a determination that the user is proximate to the second display device:
  - modify the spatial audio rendering function to reflect media playback at the second display device in response to a determination that a signal-to-noise ratio of the sensor information associated with the other sensor is greater than a signal-to-noise ratio of the sensor information associated with the second sensor.

16. The device of claim 8, wherein a camera is integrated into the wearable device, and wherein the one or more processors are further configured to execute the instructions to:
- determine, based on feedback from the camera, that the user is focused on a second display device; and
- modify the spatial audio rendering function to reflect media playback at the second display device in response to a determination that the user is focused on the second display device.

17. The device of claim 1, further comprising a modem coupled to the one or more processors, the modem configured to receive media content for the media playback, receive the sensor information associated with the first sensor, or a combination thereof.

18. A method of controlling spatial audio rendering, the method comprising:
- comparing a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and
- based on the comparison result, controlling a spatial audio rendering function associated with media playback.

19. The method of claim 18, wherein the second sensor type is distinct from the first sensor type.

20. The method of claim 18, wherein the sensor information associated with the first sensor comprises measured light reflections indicative of blood volume variations associated with a user, and wherein the first sensor comprises a photoplethysmogram (PPG) sensor.

21. The method of claim 18, wherein the sensor information associated with the second sensor is determined based on reflected electromagnetic waves that are transmitted from the second sensor, wherein the second sensor comprises a millimeter wave (mmWave) radar sensor.

22. The method of claim 18, wherein controlling the spatial audio rendering function comprises enabling use of the spatial audio rendering function in response to the comparison result indicating that the first heartbeat pattern is within an alignment threshold of the second heartbeat pattern.

23. The method of claim 18, wherein controlling the spatial audio rendering function comprises disabling use of the spatial audio rendering function in response to the comparison result indicating that the first heartbeat pattern is not within an alignment threshold of the second heartbeat pattern.

24. The method of claim 18, wherein controlling the spatial audio rendering function comprises transitioning the spatial audio rendering function to operate in a low-power mode in response to the comparison result indicating that the first heartbeat pattern is not within an alignment threshold of the second heartbeat pattern.

25. The method of claim 18, wherein the first sensor is integrated into a wearable device worn by a user, and wherein the second sensor is integrated into a display device that is configured to display media content associated with the media playback.

26. The method of claim 25, further comprising determining whether the user is within a vicinity of the display device based on additional sensor information, wherein the first heartbeat pattern is compared to the second heartbeat pattern in response to a determination that the user is in the vicinity of the display device.

27. A non-transitory computer-readable medium comprising instructions that, when executed by one or more processors, cause the one or more processors to:
- compare a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and
- based on the comparison result, control a spatial audio rendering function associated with media playback.

28. The non-transitory computer-readable medium of claim 27, wherein the sensor information associated with the first sensor comprises measured light reflections indicative of blood volume variations associated with a user, and wherein the first sensor comprises a photoplethysmogram (PPG) sensor.

29. The non-transitory computer-readable medium of claim 27, wherein the sensor information associated with the second sensor is determined based on reflected electromagnetic waves that are transmitted from the second sensor, wherein the second sensor comprises a millimeter wave (mmWave) radar sensor.

30. An apparatus comprising:
- means for comparing a first heartbeat pattern to a second heartbeat pattern to generate a comparison result, the first heartbeat pattern based on sensor information associated with a first sensor of a first sensor type, and the second heartbeat pattern based on sensor information associated with a second sensor of a second sensor type; and
- means for controlling a spatial audio rendering function associated with media playback based on the comparison result.

\* \* \* \* \*